US012625341B2

(12) United States Patent
Yang et al.

(10) Patent No.: US 12,625,341 B2
(45) Date of Patent: May 12, 2026

(54) LIGHT BLOCKING SHEET, IMAGING LENS ASSEMBLY AND ELECTRONIC DEVICE

(71) Applicant: LARGAN PRECISION CO., LTD., Taichung City (TW)

(72) Inventors: Shu-Yun Yang, Taichung City (TW); Chen-Wei Fan, Taichung City (TW); Ming-Ta Chou, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 931 days.

(21) Appl. No.: 17/745,922

(22) Filed: May 17, 2022

(65) Prior Publication Data

US 2022/0413191 A1      Dec. 29, 2022

(30) Foreign Application Priority Data

Jun. 28, 2021    (TW) ................................. 110123641

(51) Int. Cl.
| | |
|---|---|
| *G02B 7/02* | (2021.01) |
| *G02B 13/00* | (2006.01) |
| *G02B 13/02* | (2006.01) |
| *G02B 5/00* | (2006.01) |

(52) U.S. Cl.
CPC ............. *G02B 7/02* (2013.01); *G02B 13/002* (2013.01); *G02B 13/02* (2013.01); *G02B 5/003* (2013.01)

(58) Field of Classification Search
None
See application file for complete search history.

(56) References Cited

U.S. PATENT DOCUMENTS

| | | | |
|---|---|---|---|
| 2018/0003959 A1 | 1/2018 | Lin | |
| 2018/0246260 A1 | 8/2018 | Chou | |
| 2020/0374434 A1* | 11/2020 | Cotoros | ................. H04N 23/69 |
| 2021/0072487 A1 | 3/2021 | Cheng et al. | |
| 2021/0389511 A1 | 12/2021 | Zhang et al. | |

FOREIGN PATENT DOCUMENTS

| | | | |
|---|---|---|---|
| CN | 203981945 U | 12/2014 | |
| CN | 204536581 U | 8/2015 | |
| CN | 206431350 U | 8/2017 | |
| CN | 212301949 U | 1/2021 | |
| IN | 201724044023 | 7/2017 | |
| TW | I633381 B | 8/2018 | |
| TW | I649608 B | 2/2019 | |
| WO | WO-2020200206 A1* | 10/2020 | ............. G01S 17/42 |

* cited by examiner

*Primary Examiner* — Stephone B Allen
*Assistant Examiner* — Tamara Y. Washington
(74) *Attorney, Agent, or Firm* — McClure, Qualey & Rodack, LLP

(57) ABSTRACT

A light blocking sheet includes a central opening and a plurality of light blocking structures. A central axis passes through the central opening. The light blocking structures surround an inner peripheral surface of the central opening, the light blocking structures are tapered and extended from the central opening towards a direction close to the central axis, and the light blocking structures are for defining a circumscribed circle and an inscribed circle, wherein a plurality of inscribed circle ends of the light blocking structures close to the central axis are contacted with the inscribed circle, and a plurality of circumscribed circle ends of the light blocking structures away from the central axis are contacted with the circumscribed circle.

18 Claims, 20 Drawing Sheets

100

412

LIGHT BLOCKING SHEET, IMAGING LENS ASSEMBLY AND ELECTRONIC DEVICE

RELATED APPLICATIONS

This application claims priority to Taiwan Application Serial Number 110123641, filed Jun. 28, 2021, which is herein incorporated by reference.

BACKGROUND

Technical Field

The present disclosure relates to a light blocking sheet and an imaging lens assembly. More particularly, the present disclosure relates to a light blocking sheet and an imaging lens assembly applicable to the portable electronic devices.

Description of Related Art

In recent years, portable electronic devices have developed rapidly. For example, intelligent electronic devices and tablets, etc., have been filled in the lives of modern people, and the imaging lens assemblies and the light blocking sheets thereof employed in the portable electronic devices have also prospered. However, as technology advances, the quality requirements of the light blocking sheet are becoming higher and higher.

In detail, a plurality of light blocking structures of the light blocking sheet can reduce the noise interference when the imaging lens assembly is in the scene of the accent light source. When the extended heights of the light blocking structures are increased, the anti-noise ability of the imaging lens assembly in the scene of the accent light source can be enhanced. However, at the same time, the image quality will decrease easily due to the excessive shading of the imaging lens assembly. Therefore, a light blocking sheet which can reduce the excessive shading and have the anti-noise ability in the scene of the accent light source needs to be developed.

SUMMARY

According to one aspect of the present disclosure, a light blocking sheet includes a central opening and a plurality of light blocking structures. A central axis passes through the central opening. The light blocking structures surround an inner peripheral surface of the central opening, the light blocking structures are tapered and extended from the central opening towards a direction close to the central axis, and the light blocking structures are for defining a circumscribed circle and an inscribed circle, wherein a plurality of inscribed circle ends of the light blocking structures close to the central axis are contacted with the inscribed circle, and a plurality of circumscribed circle ends of the light blocking structures away from the central axis are contacted with the circumscribed circle. A light transmission portion is between the inscribed circle and each of the light blocking structures, and a light blocking portion is between the circumscribed circle and each of the light blocking structures. When a radius of the inscribed circle is Ri, a radius of the circumscribed circle is Ro, a value of an area of the circumscribed circle minus an area of the inscribed circle is AA, an area of the light transmission portions is A1, and an area of the light blocking portions is A2, the following conditions are satisfied: 34 $\mu m \leq Ro-Ri \leq 157$ $\mu m$; AA=A1+A2; and 0.9$\leq$A1/A2$\leq$5.4.

According to one aspect of the present disclosure, an imaging lens assembly includes the light blocking sheet of the aforementioned aspect and at least two optical lens elements. The at least two optical lens elements and the light blocking sheet are disposed in a lens barrel along the central axis. The imaging lens assembly has a first field of view, when the first field of view is FOV1, the following condition is satisfied: 18 degrees$\leq$FOV1$\leq$51 degrees.

According to one aspect of the present disclosure, an electronic device includes at least two imaging lens assemblies. The at least two imaging lens assemblies have different field of views, one of the at least two imaging lens assemblies is a first imaging lens assembly, and the first imaging lens assembly has a first field of view, wherein the first imaging lens assembly includes at least one light blocking sheet, and the at least one light blocking sheet includes a central opening and a plurality of light blocking structures. A central axis of the first imaging lens assembly passes through the central opening. The light blocking structures surround an inner peripheral surface of the central opening, the light blocking structures are tapered and extended from the central opening towards a direction close to the central axis, and the light blocking structures are for defining a circumscribed circle and an inscribed circle, wherein a plurality of inscribed circle ends of the light blocking structures close to the central axis are contacted with the inscribed circle, and a plurality of circumscribed circle ends of the light blocking structures away from the central axis are contacted with the circumscribed circle. When the first field of view is FOV1, a radius of the inscribed circle is Ri, and a radius of the circumscribed circle is Ro, the following conditions are satisfied: 18 degrees$\leq$FOV1$\leq$51 degrees; and 34 $\mu m \leq Ro-Ri \leq 157$ $\mu m$.

BRIEF DESCRIPTION OF THE DRAWINGS

The present disclosure can be more fully understood by reading the following detailed description of the embodiment, with reference made to the accompanying drawings as follows.

3

Figure 4A:
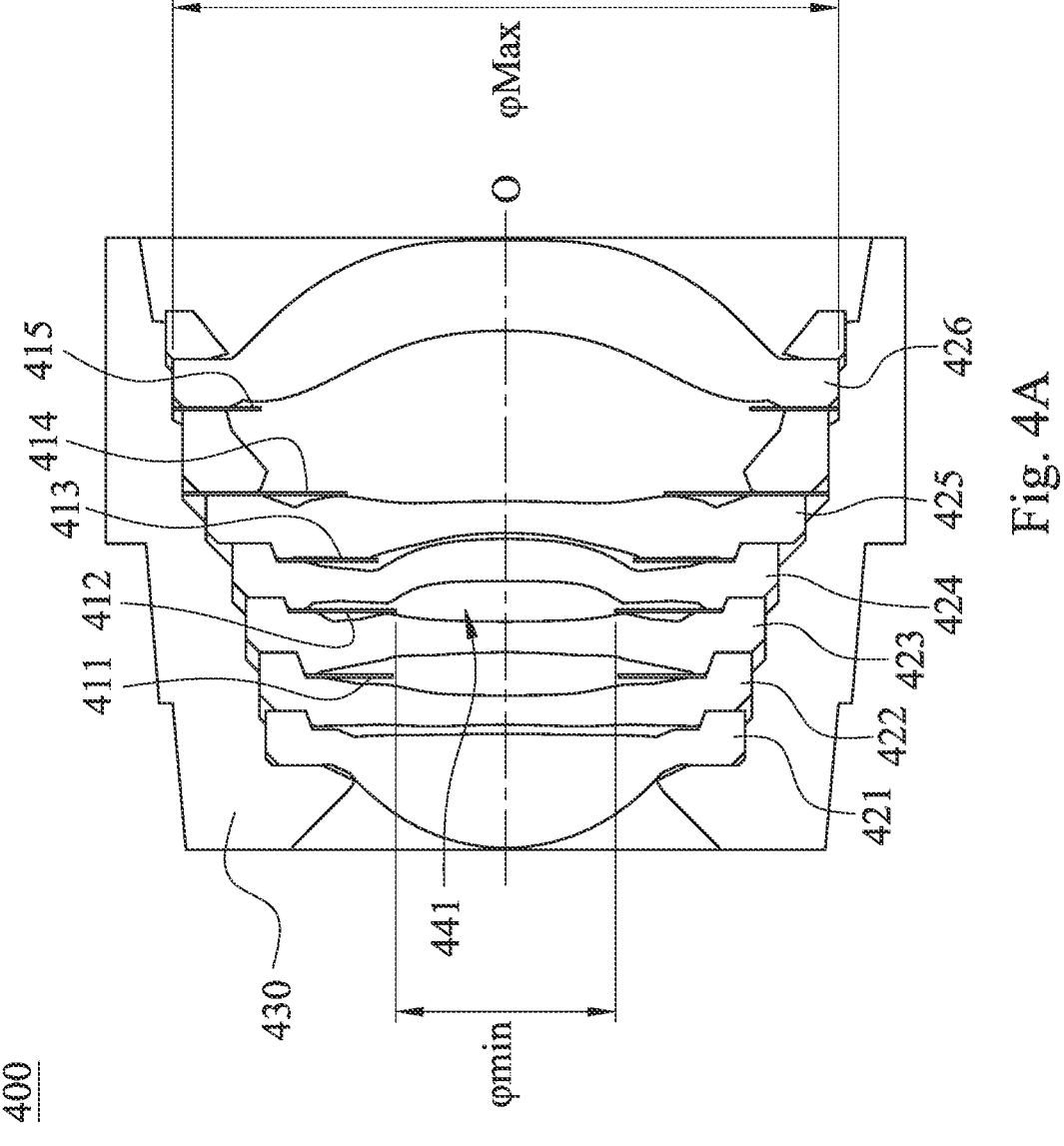
FIG. 4A is a schematic view of an imaging lens assembly according to the 4th embodiment of the present disclosure.
Figure 4B:
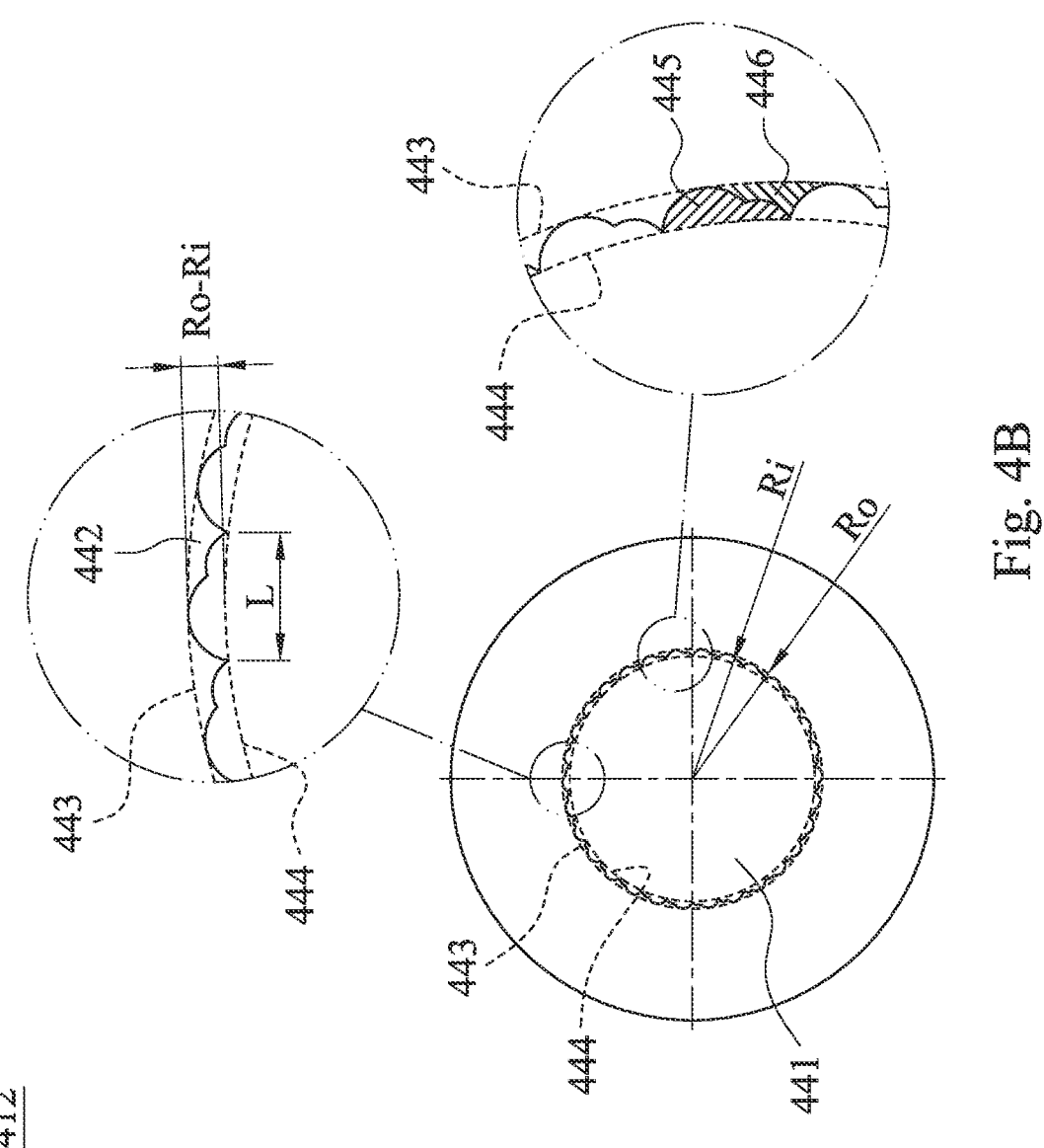
FIG. 4B is a schematic view of the light blocking sheet according to the 4th embodiment of FIG. 4A.
Figure 4C:
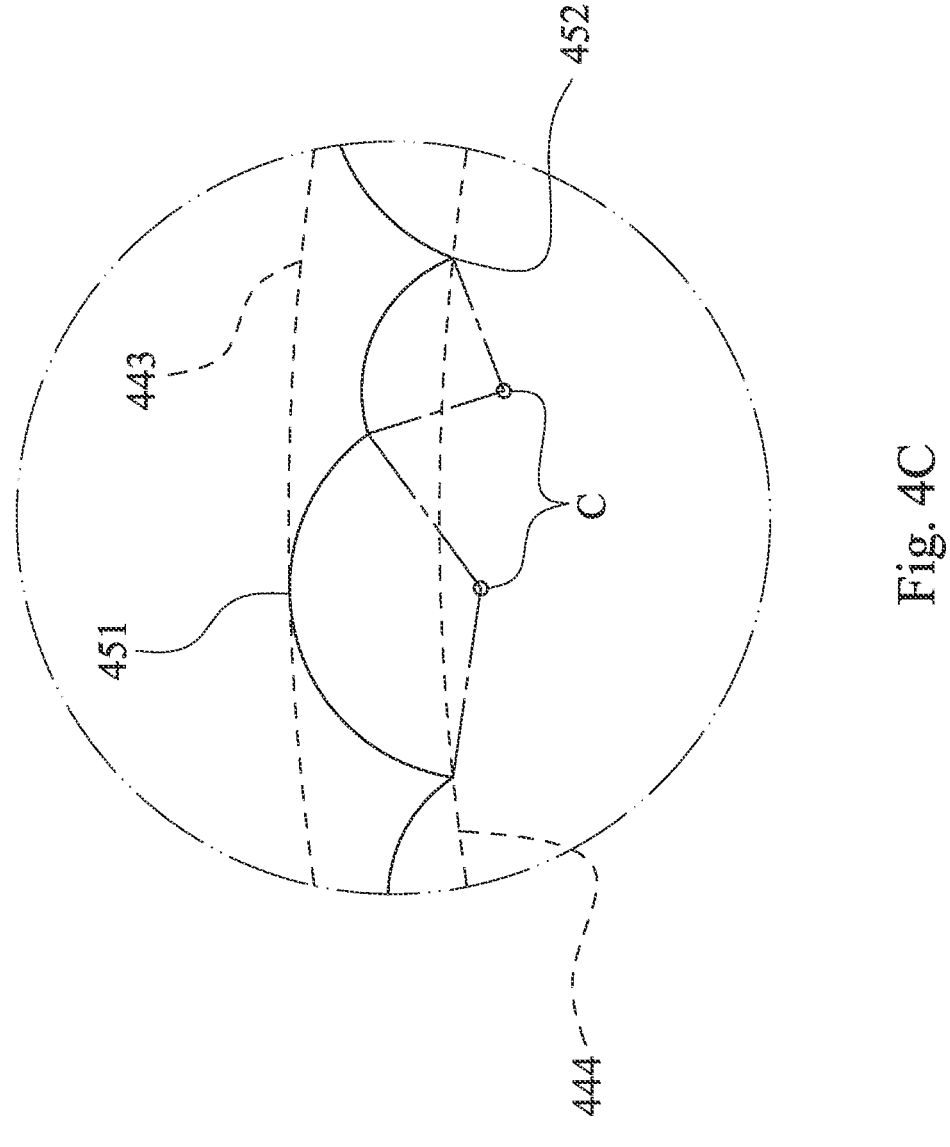

FIG. 4C is an enlarged schematic view of partial of the light blocking sheet according to the 4th embodiment of FIG. 4B.

Figure 5A:
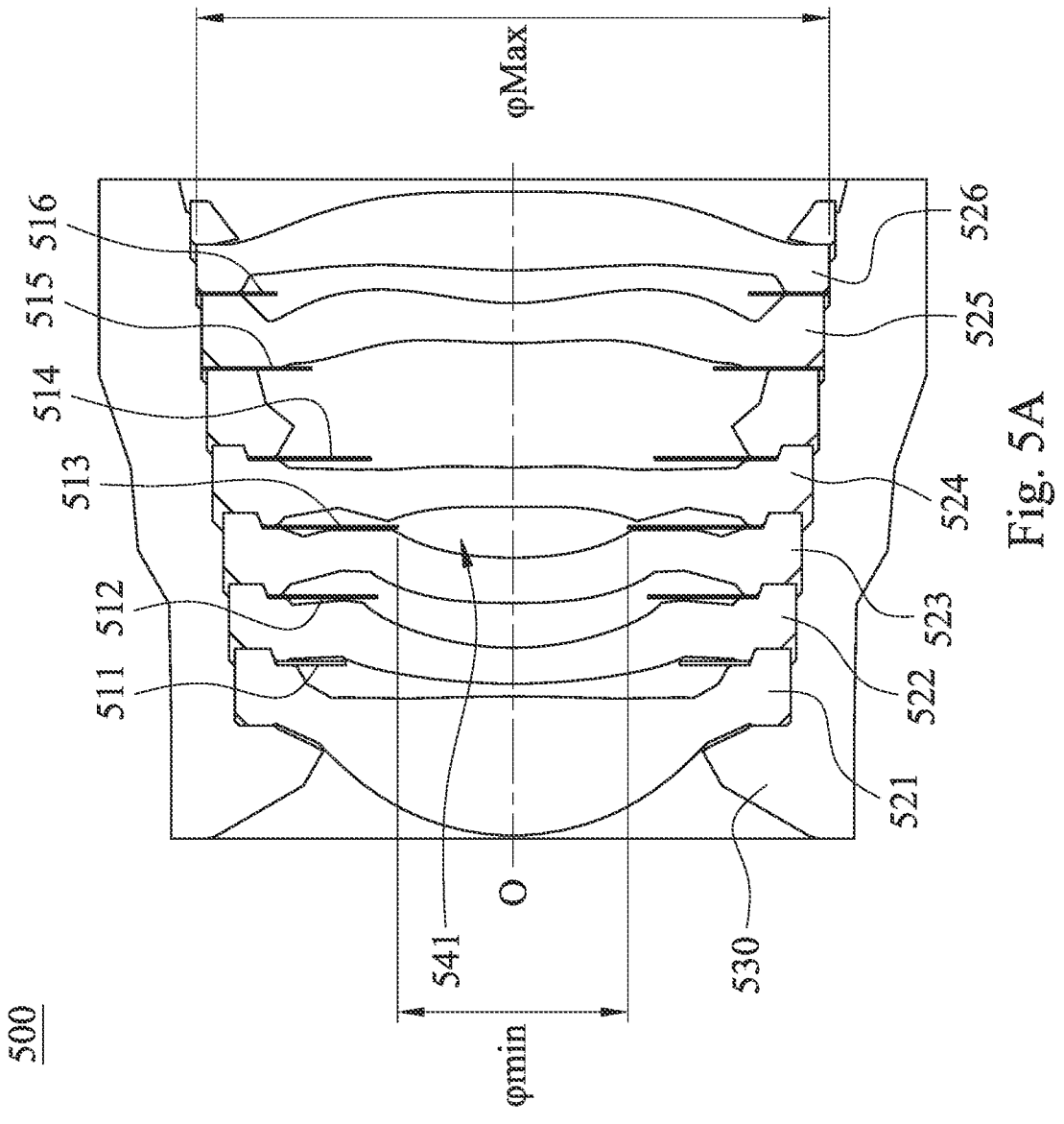

FIG. 5A is a schematic view of an imaging lens assembly according to the 5th embodiment of the present disclosure.

Figure 5B:
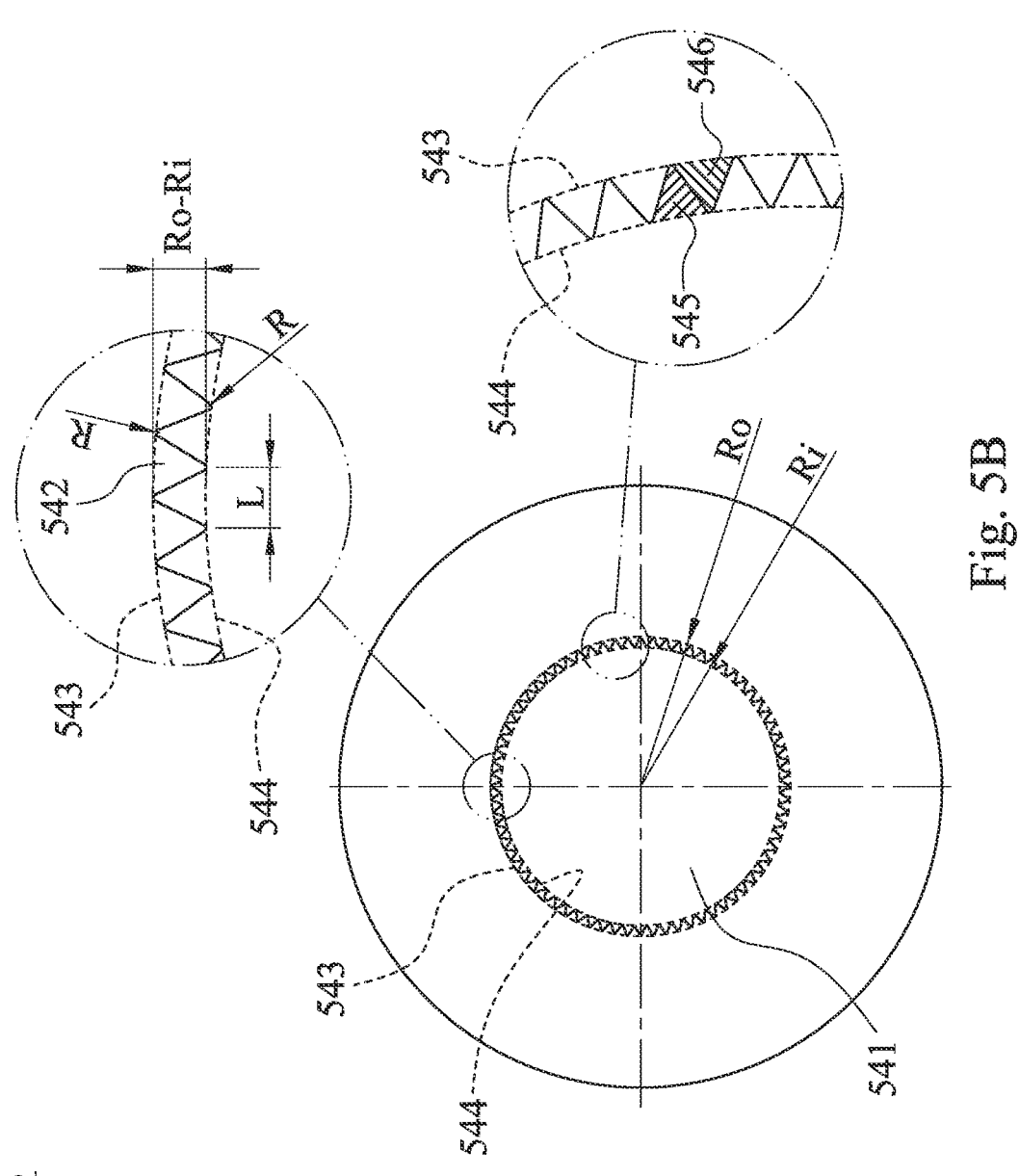

FIG. 5B is a schematic view of the light blocking sheet according to the 5th embodiment of FIG. 5A.

Figure 5C:
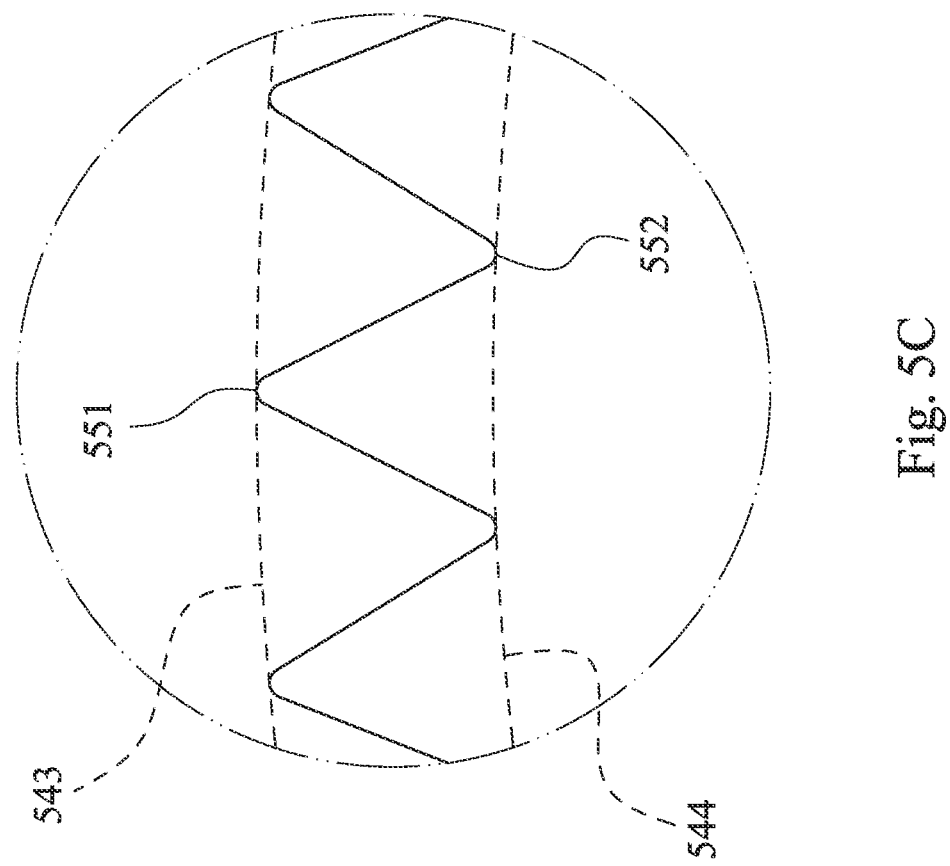

FIG. 5C is an enlarged schematic view of partial of the light blocking sheet according to the 5th embodiment of FIG. 5B.

Figure 6A:
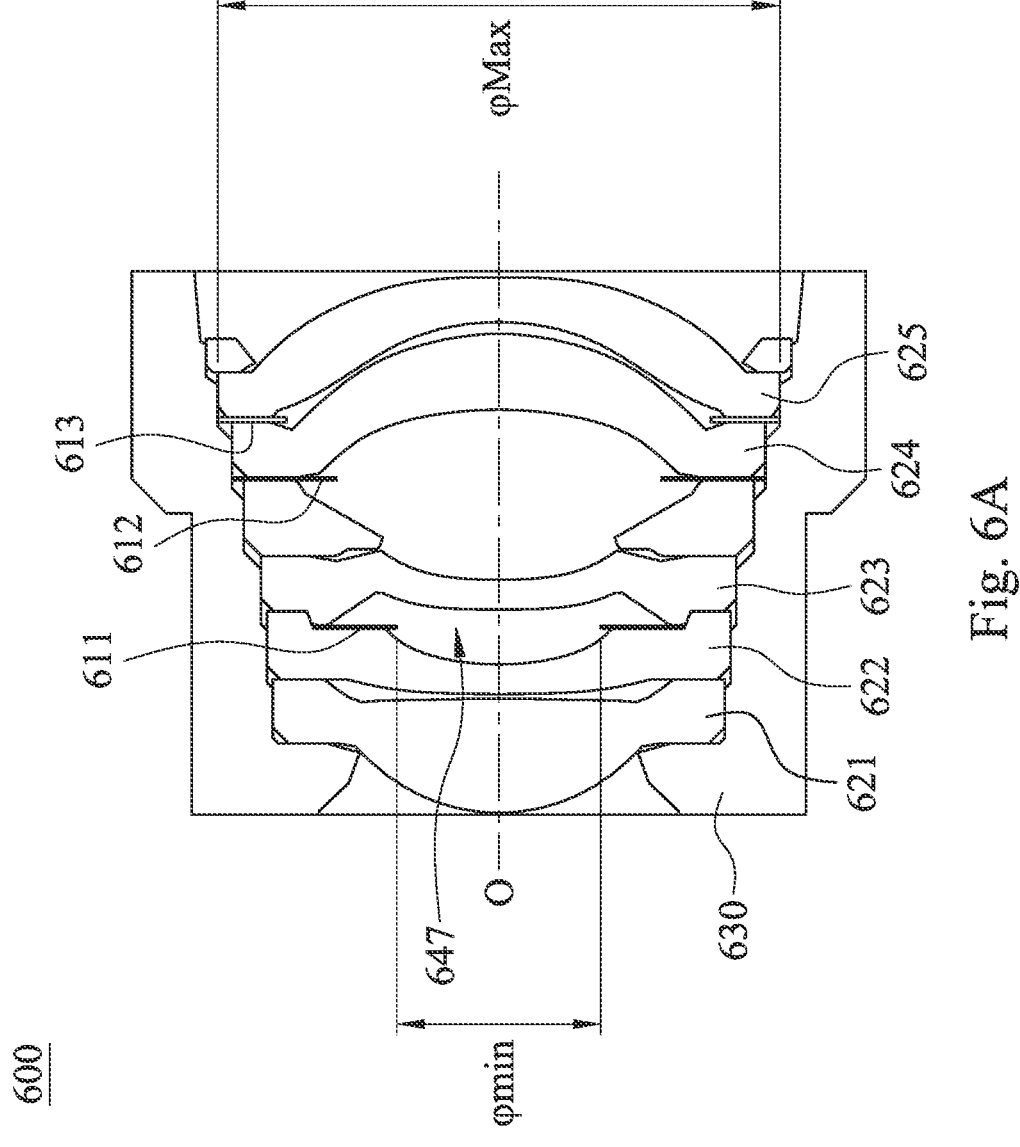

FIG. 6A is a schematic view of an imaging lens assembly according to the 6th embodiment of the present disclosure.

Figure 6B:
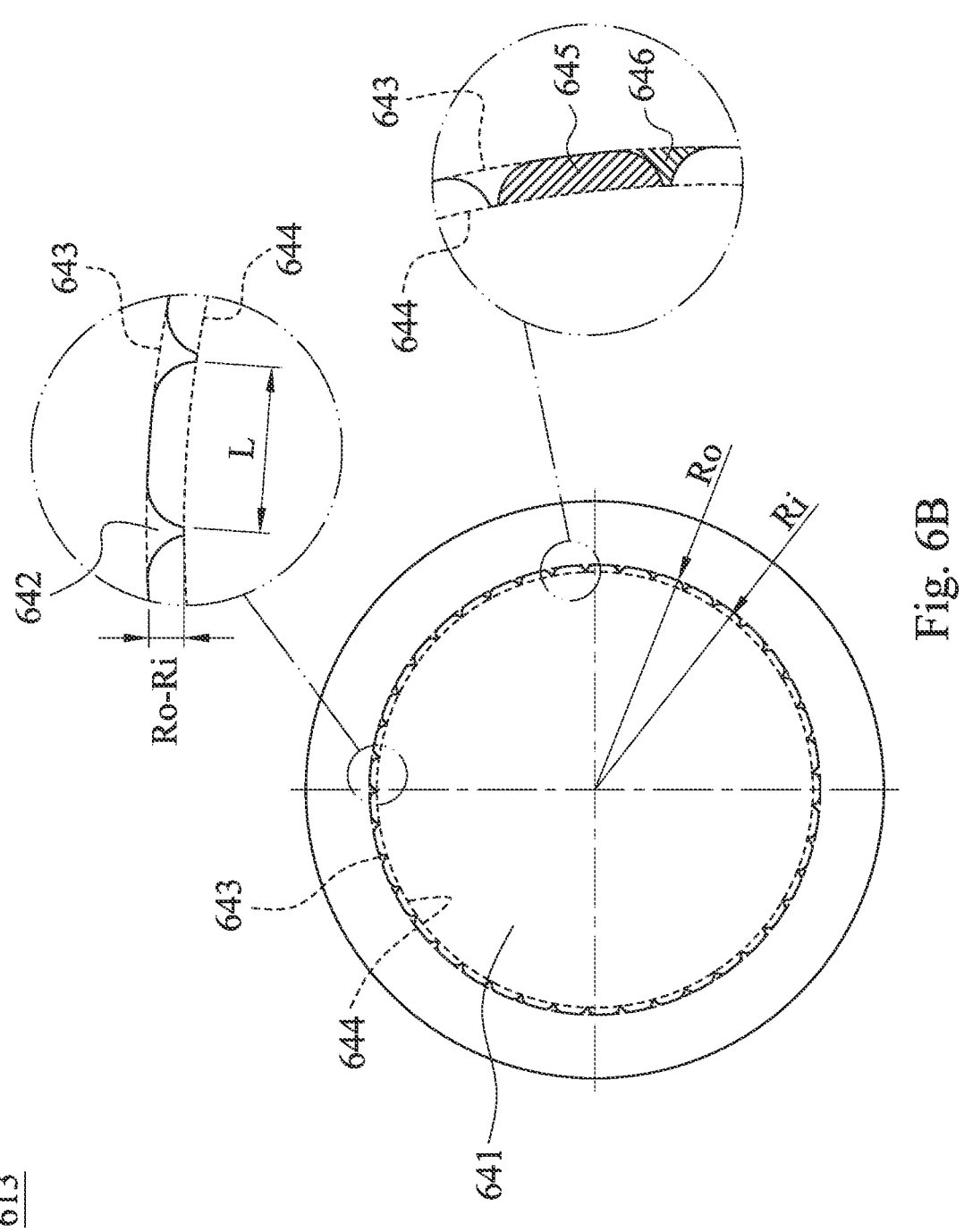

FIG. 6B is a schematic view of the light blocking sheet according to the 6th embodiment of FIG. 6A.

Figure 6C:
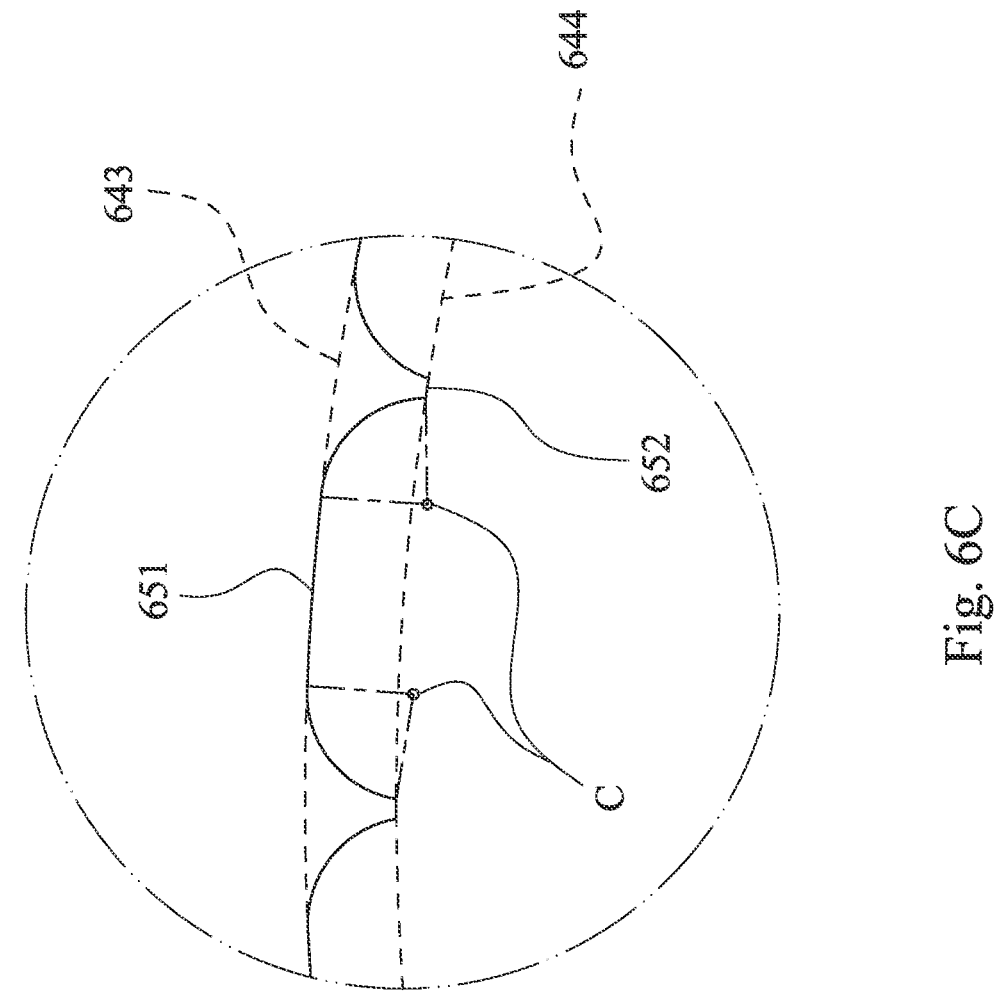

FIG. 6C is an enlarged schematic view of partial of the light blocking sheet according to the 6th embodiment of FIG. 6B.

Figure 7A:
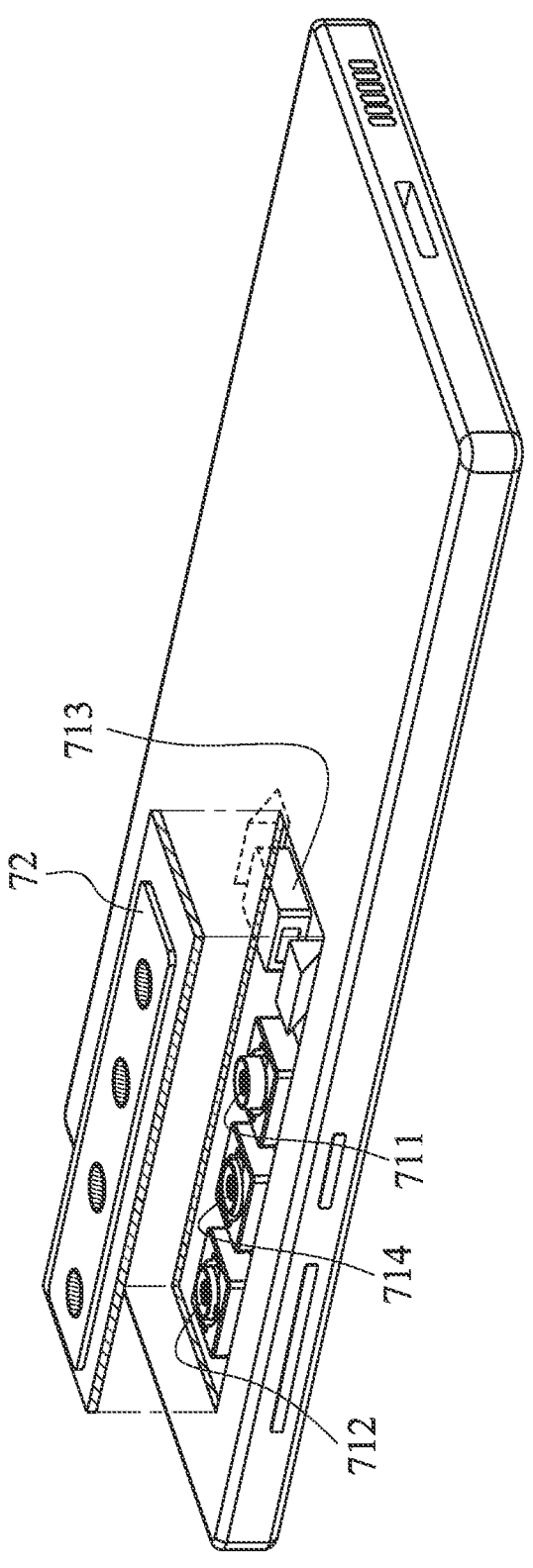

FIG. 7A is a schematic view of an electronic device according to the 7th embodiment of the present disclosure.

Figure 7B:
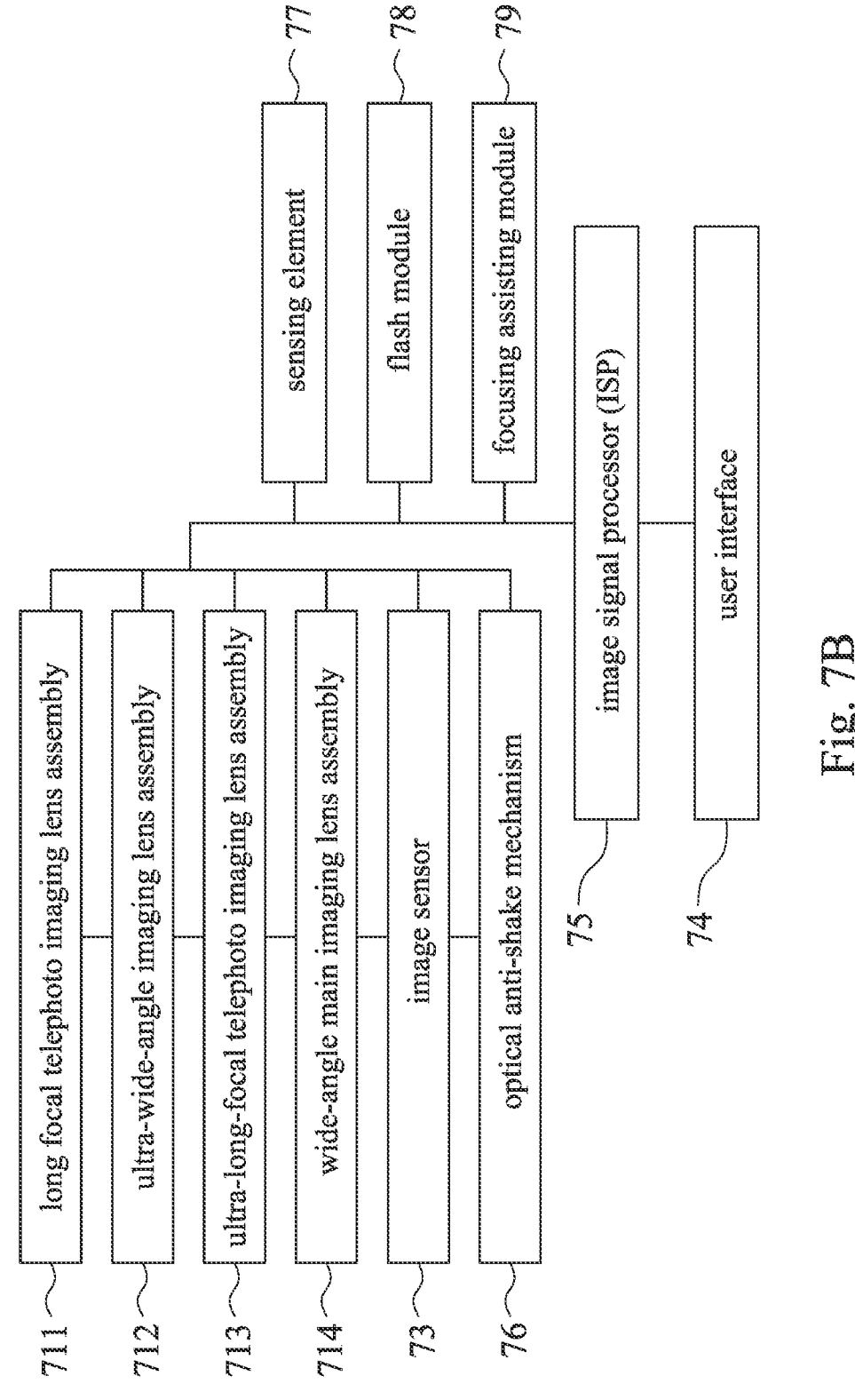

FIG. 7B is a block diagram of the electronic device according to the 7th embodiment of FIG. 7A.

DETAILED DESCRIPTION

The present disclosure provides a light blocking sheet. The light blocking sheet includes a central opening and a plurality of light blocking structures. A central axis passes through the central opening and the light blocking structures surround an inner peripheral surface of the central opening. The light blocking structures are tapered and extended from the central opening towards a direction close to the central axis, and the light blocking structures are for defining a circumscribed circle and an inscribed circle. A plurality of inscribed circle ends of the light blocking structures close to the central axis are contacted with the inscribed circle, and a plurality of circumscribed circle ends of the light blocking structures away from the central axis are contacted with the circumscribed circle. A light transmission portion is between the inscribed circle and each of the light blocking structures. A light blocking portion is between the circumscribed circle and each of the light blocking structures. When a radius of the inscribed circle is Ri, a radius of the circumscribed circle is Ro, a value of an area of the circumscribed circle minus an area of the inscribed circle is AA, an area of the light transmission portions is A1, and an area of the light blocking portions is A2, the following conditions are satisfied: 34 $\mu$m$\leq$Ro$-$Ri$\leq$157 $\mu$m; AA=A1+A2; and 0.9$\leq$A1/A2$\leq$5.4. In detail, it is favorable for solving the problems of excessive shading due to excessive extended height of the light blocking structures, enhancing the image quality and obtaining anti-noise ability by controlling an area ratio of the light blocking portions and the light transmission portions of the light blocking structures in the present disclosure. Therefore, the original scene can be truly recovered under the harsh environment so as to obtain the image with low noise interference. In detail, the harsh environment can be a scene facing towards the accent light source or low ambient light source.

Further, the light blocking structures can be composed of straight segments or arc segments. Each inscribed circle end and each circumscribed circle end of the light blocking structures can be an end point, respectively, or can be the arc segment coincides with the inscribed circle or the circumscribed circle, respectively. Therefore, it is favorable for enhancing the image quality by avoiding the excessive shading of the light blocking structures.

4

The light blocking sheet and the light blocking structures can be formed integrally which is favorable for enhancing the manufacture efficiency and suitable for the mass production.

A surface of the light blocking sheet can include a matting layer. Further, the light blocking sheet can be made of the metal material or the composite material. The metal material can be treated with grit blasting, smudging or coating. The composite material can be composed of the stacking multi layers, such as the strip which is composed of a plastic material layer covered by double black carbon material on both sides thereof. The material will not be limited thereto. Therefore, it is favorable for enhancing the anti-noise ability of the light blocking sheet under the scene of the accent light source.

The light transmission portion of each of the light blocking structures can include at least one arc segment, and the curvature center of the arc segment is disposed in the inscribed circle. Therefore, it is favorable for increasing the area of the light transmission portions by the arcs of the light blocking structures facing towards the inside of the inscribed circle so as to enhance the relative illuminance.

When the radius of the inscribed circle is Ri, and the radius of the circumscribed circle is Ro, the following condition can be satisfied: 46 $\mu$m$\leq$Ro$-$Ri$\leq$112 $\mu$m. Therefore, it is favorable for further enhancing the shading effect of the light blocking structures.

When the radius of the inscribed circle is Ri, the radius of the circumscribed circle is Ro, and a distance between two of the inscribed circle ends adjacent to each other is L, the following condition can be satisfied: 0.27$\leq$(Ro$-$Ri)/L$\leq$1.32. Therefore, it is favorable for avoiding adjacent light blocking structures being too close to each other so as to prevent the excessive shading.

When a number of the light blocking structures is N, the following condition can be satisfied: 28$\leq$N$\leq$93. Therefore, it is favorable for avoiding the excessive shading of the light blocking sheet and obtaining the anti-noise ability under the scene of accent light source.

When the area of the light transmission portions is A1, and the area of the light blocking portions is A2, the following condition can be satisfied: 1.05$\leq$A1/A2$\leq$3.4. Therefore, it is favorable for further enhancing the image quality and reducing the noise interference under environments with accent light source and low ambient light source.

Each of the aforementioned technical features of the light blocking sheet can be combined with each other and reach the corresponded effect.

The present disclosure provides an imaging lens assembly. The imaging lens assembly includes the aforementioned light blocking sheet and at least two optical lens elements, wherein the optical lens elements and the light blocking sheet are disposed in a lens barrel along the central axis. The imaging lens assembly has a first field of view, when the first field of view is FOV1, the following condition is satisfied: 18 degrees$\leq$FOV1$\leq$51 degrees. Therefore, it is favorable for reducing the excessive shading by the small field of view of the imaging lens assembly.

The present disclosure provides an electronic device. The electronic device includes at least two imaging lens assemblies, wherein each imaging lens assembly has a different field of view. One of the imaging lens assemblies is a first imaging lens assembly, and the first imaging lens assembly has a first field of view. The first imaging lens assembly includes at least one light blocking sheet, wherein the light blocking sheet includes a central opening and a plurality of light blocking structures. A central axis of the first imaging lens assembly passes through the central opening, and the light blocking structures surround an inner peripheral surface of the central opening. The light blocking structures are tapered and extended from the central opening towards a direction close to the central axis, and the light blocking structures are for defining a circumscribed circle and an inscribed circle. A plurality of inscribed circle ends of the light blocking structures close to the central axis are contacted with the inscribed circle, and a plurality of circumscribed circle ends of the light blocking structures away from the central axis are contacted with the circumscribed circle. When the first field of view is FOV1, a radius of the inscribed circle is Ri, and a radius of the circumscribed circle is Ro, the following conditions are satisfied: 18 degrees s FOV1≤51 degrees; and 34 μm≤Ro−Ri≤157 μm. In detail, the first imaging lens assembly can be a long focal telephoto lens which has a small field of view. Therefore, it is favorable for further reducing the excessive shading by the characteristic of smaller incidence angle of the light of the first imaging lens assembly.

Further, the electronic device includes the imaging lens assemblies in different field of views, when one of the imaging lens assemblies has a specific field of view, it is favorable for obtaining a relatively same image quality while screen switching of the imaging lens assemblies under the harsh environment by the light blocking structures of the light blocking sheet. Therefore, it is favorable for preventing the image quality from discrepancy and time difference by photo shooting under the different field of view which changes continuously so as to maintain better shooting experience.

Furthermore, the light blocking structures can be composed of straight segments or arc segments. Each inscribed circle end and each circumscribed circle end of the light blocking structures can be an end point, respectively, or can be the arc segment coincides with the inscribed circle or the circumscribed circle, respectively. Therefore, it is favorable for avoiding the excessive shading of the light blocking structures so as to enhance the image quality. Further, the original scene can be truly recovered under the harsh environment so as to obtain the image with low noise interference. In detail, the harsh environment can be a scene facing towards the accent light source or low ambient light source.

The light blocking sheet and the light blocking structures can be formed integrally which is favorable for enhancing the manufacture efficiency and suitable for the mass production.

A surface of the light blocking sheet can include a matting layer. Therefore, it is favorable for enhancing the anti-noise ability of the light blocking sheet under the scene of the accent light source.

The light transmission portion of each of the light blocking structures can include at least one arc segment, and the curvature center of the arc segment is disposed in the inscribed circle. Therefore, it is favorable for increasing the area of the light transmission portions by the arcs of the light blocking structures facing towards the inside of the inscribed circle so as to enhance the relative illuminance.

Another one of the imaging lens assemblies can be a second imaging lens assembly, and the second imaging lens assembly has a second field of view. When the second field of view is FOV2, the following condition can be satisfied: 68 degrees≤FOV2≤175 degrees. In detail, the second imaging lens assembly can be a wide-angle lens assembly or an ultra-wide-angle lens assembly. Further, the electronic device can accomplish the function of the optical zoom with switching the different field of views of the imaging lens assemblies.

A number of the imaging lens assemblies can be at least three, further another one of the imaging lens assemblies can be a third imaging lens assembly, and the third imaging lens assembly has a third field of view. When the third field of view is FOV3, the following condition can be satisfied: 5 degrees≤FOV3≤22 degrees. In detail, the third imaging lens assembly can be an ultra-long-focal telephoto lens assembly. Further, the electronic device can accomplish the function of the optical zoom with switching the different field of views of the imaging lens assemblies.

The first imaging lens assembly can further include at least two optical lens elements, wherein the one of the optical lens elements has a maximum outer diameter. The number of the light blocking sheet can be plural, and the central opening of the one of the light blocking sheets has a minimum inner diameter. When the maximum outer diameter of the one of the optical lens elements is φMax, and the minimum inner diameter of the central opening of the one of the light blocking sheets is φmin, the following condition can be satisfied: $0.29 \leq \varphi min/\varphi Max \leq 0.79$. Therefore, it is favorable for obtaining better image quality.

When the maximum outer diameter of the one of the optical lens elements is φMax, and an effective focal length of the first imaging lens assembly is EFL, the following condition can be satisfied: $0.8 \leq EFL/\varphi Max \leq 4.2$. Therefore, it is favorable for obtaining better image quality.

When the first field of view is FOV1, the following condition can be satisfied: 22 degrees≤FOV1≤40 degrees. Therefore, it is favorable for further avoiding the problems of excessive shading.

When the radius of the inscribed circle is Ri, and the radius of the circumscribed circle is Ro, the following condition can be satisfied: 46 μm≤Ro−Ri≤112 μm. Therefore, it is favorable for further enhancing the shading effect of the light blocking structures.

When the radius of the inscribed circle is Ri, the radius of the circumscribed circle is Ro, and the distance between two of the inscribed circle ends adjacent to each other is L, the following condition can be satisfied: $0.27 \leq (Ro-Ri)/L \leq 1.32$. Therefore, it is favorable for avoiding adjacent light blocking structures being too close to each other so as to prevent the excessive shading.

When a number of the light blocking structures is N, the following condition can be satisfied: 28≤N≤93. Therefore, it is favorable for avoiding the excessive shading of the light blocking sheet and maintaining the anti-noise ability of the first imaging lens assembly under the scene of the accent light source.

A light transmission portion is between the inscribed circle and each of the light blocking structures, and a light blocking portion is between the circumscribed circle and each of the light blocking structures. When a value of an area of the circumscribed circle minus an area of the inscribed circle is AA, an area of the light transmission portions is A1, and an area of the light blocking portions is A2, the following conditions can be satisfied: AA=A1+A2; and $0.9 \leq A1/A2 \leq 5.4$. Therefore, it is favorable for eliminating the stray light and controlling the value of the area of the light blocking portions to avoid the excessive shading. Further, the following condition can be satisfied: $1.05 \leq A1/A2 \leq 3.4$. Therefore, it is favorable for further enhancing the image quality and reducing the noise interference under environments with accent light source or low ambient light source.

Each of the aforementioned technical features of the electronic device can be combined with each other and reach the corresponded effect.

According to the aforementioned embodiments, the detailed descriptions and the corresponded figures as follows.

1st Embodiment

Figure 1A:
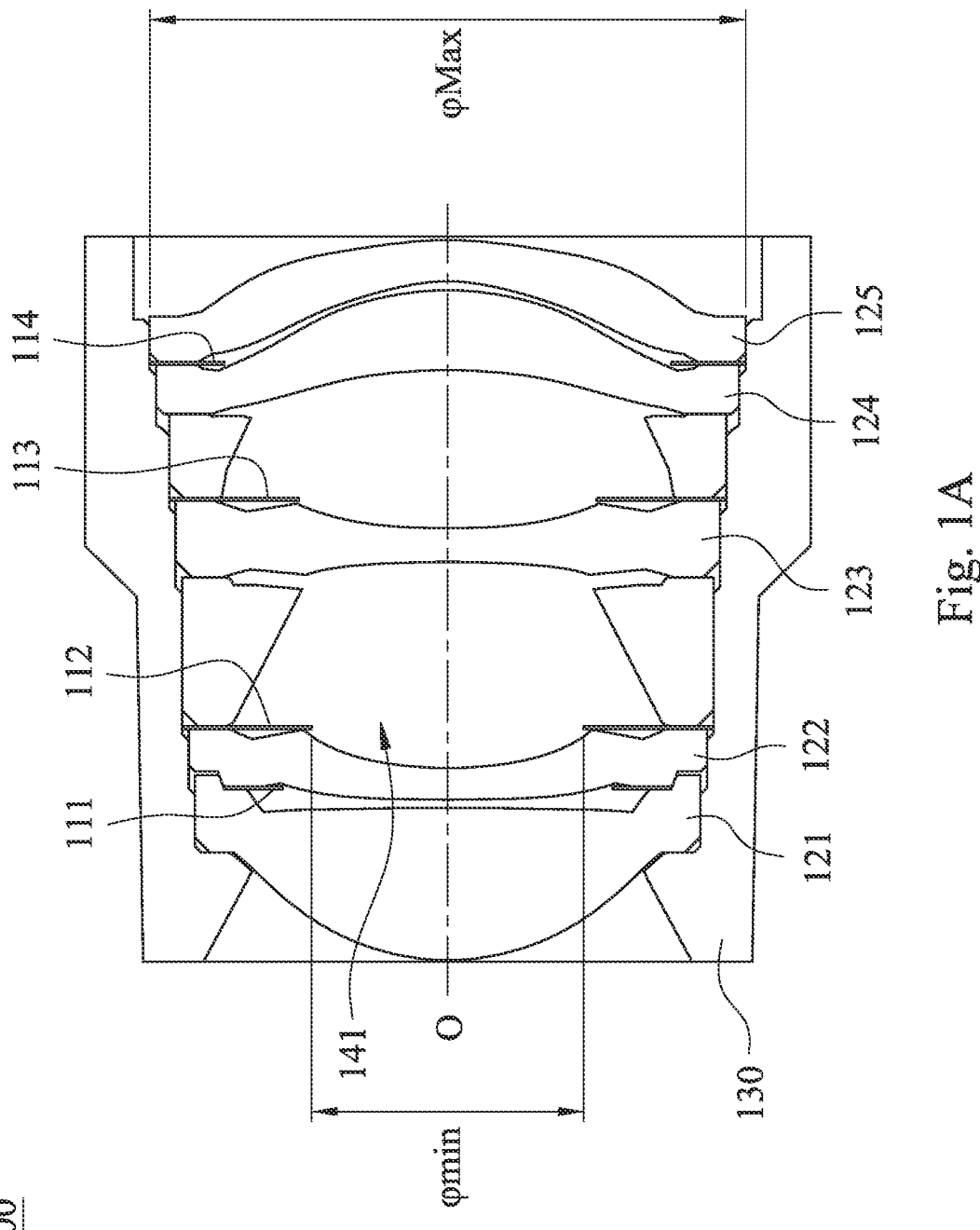
FIG. 1A is a schematic view of an imaging lens assembly according to the 1st embodiment of the present disclosure.

FIG. 1A is a schematic view of an imaging lens assembly 100 according to the 1st embodiment of the present disclosure. In FIG. 1A, the imaging lens assembly 100 includes at least one light blocking sheet, at least two optical lens elements and a lens barrel 130, wherein the optical lens elements and the light blocking sheet are disposed in the lens barrel 130 along a central axis O of the imaging lens assembly 100.

In detail, the imaging lens assembly 100 includes, from an object side to an image side, an optical lens element 121, a light blocking sheet 111, an optical lens element 122, a light blocking sheet 112, an optical lens element 123, a light blocking sheet 113, an optical lens element 124, a light blocking sheet 114 and an optical lens element 125. It should be mentioned that the optical characteristics such as the number of the optical lens elements, the structures, and the surface shape can be disposed according to different imaging requirements, but will not be limited thereto.

Figure 1B:
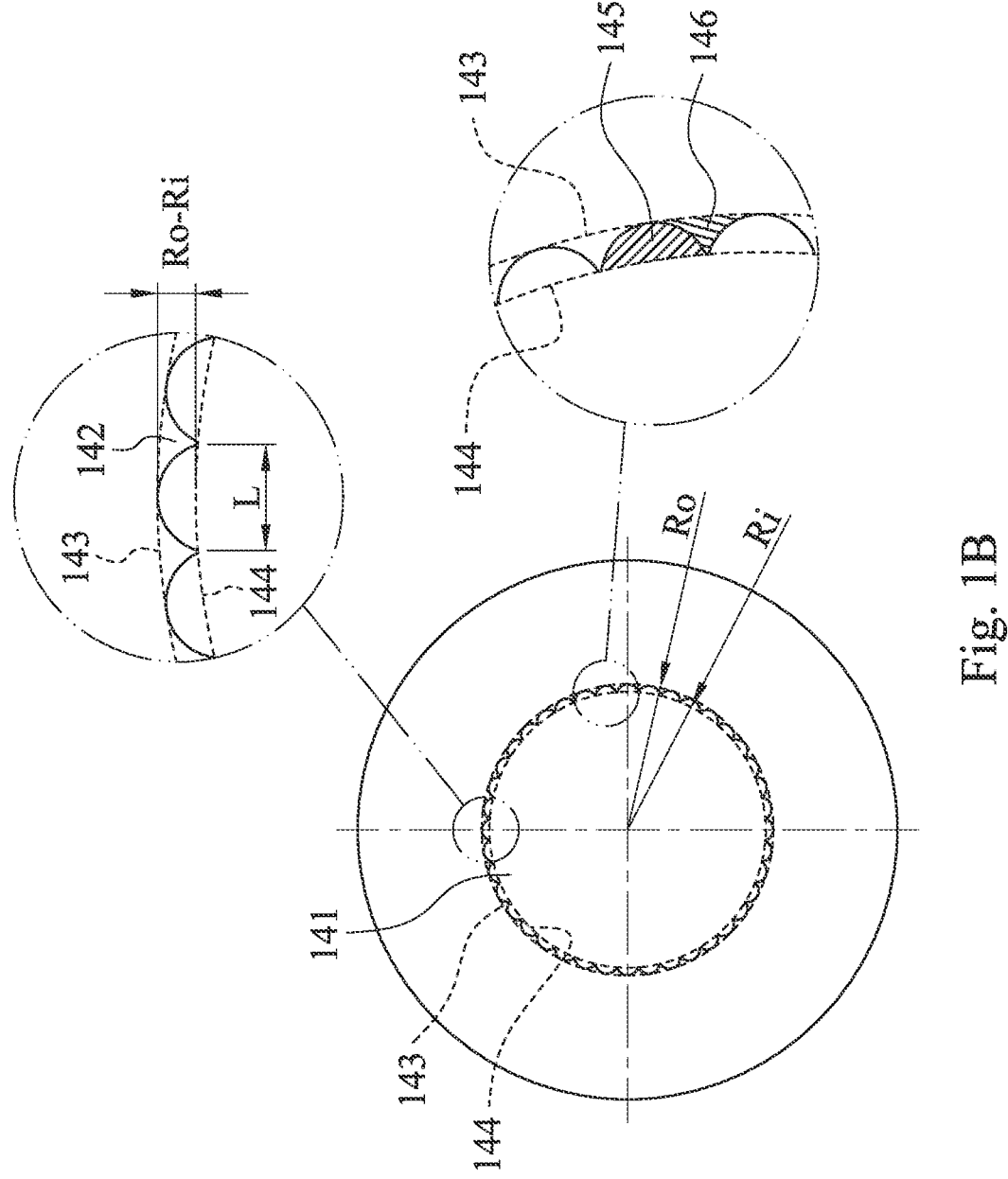
FIG. 1B is the schematic view of a light blocking sheet according to the 1st embodiment of FIG. 1A.
Figure 1C:
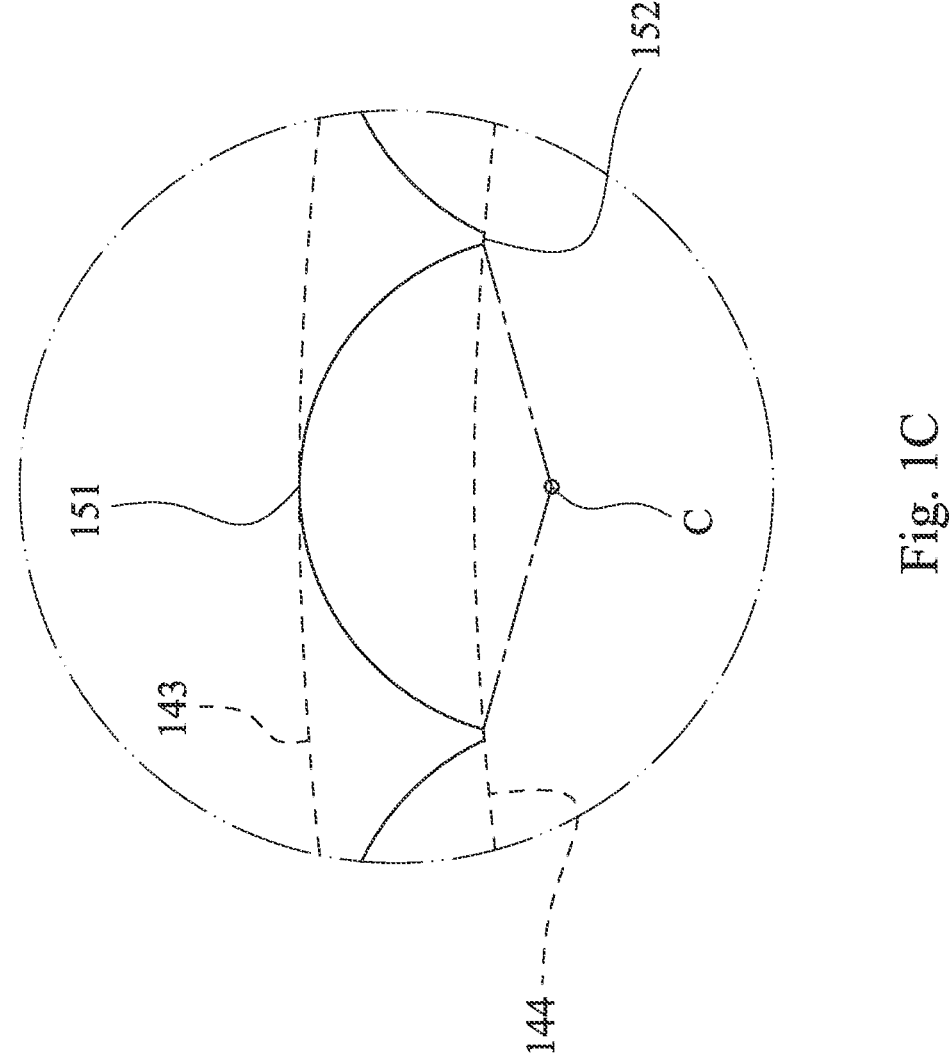
FIG. 1C is an enlarged schematic view of partial of the light blocking sheet according to the 1st embodiment of FIG. 1B.

FIG. 1B is a schematic view of the light blocking sheet 112 according to the 1st embodiment of FIG. 1A. FIG. 1C is an enlarged schematic view of partial of the light blocking sheet 112 according to the 1 st embodiment of FIG. 1B. In FIG. 1B and FIG. 1C, the light blocking sheet 112 includes a central opening 141 and a plurality of light blocking structures 142, wherein the central axis O passes through the central opening 141, the light blocking structures 142 surround an inner peripheral surface of the central opening 141, and the light blocking structures 142 are tapered and extended from the central opening 141 towards a direction close to the central axis O. In detail, the light blocking structures 142 are composed of arc segments.

The light blocking structures 142 are for defining a circumscribed circle 143 and an inscribed circle 144. A plurality of inscribed circle ends 152 of the light blocking structures 142 close to the central axis O are contacted with the inscribed circle 144. A plurality of circumscribed circle ends 151 of the light blocking structures 142 away from the central axis O are contacted with the circumscribed circle 143. Further, each inscribed circle end 152 is an arc segment which coincides with the inscribed circle 144, and each circumscribed circle end 151 is an end point which tangents with the circumscribed circle 143.

A light transmission portion 145 is between the inscribed circle 144 and each of the light blocking structures 142, and a light blocking portion 146 is between the circumscribed circle 143 and each of the light blocking structures 142.

It is favorable for avoiding the excessive shading of the light blocking structures 142 by controlling an area ratio of the light transmission portions 145 and the light blocking portions 146 so as to enhance the image quality of the imaging lens assembly 100. Further, the original scene can be truly recovered under the harsh environment so as to obtain the image with low noise interference. In detail, the harsh environment can be the scene facing towards the accent light source or low ambient light source.

The light blocking sheet 112 and the light blocking structures 142 can be formed integrally. Therefore, it is favorable for enhancing the manufacture efficiency and suitable for the mass production.

A surface of the light blocking sheet 112 can include a matting layer. Further, the light blocking sheet 112 can be made of the metal material or the composite material. The metal material can be treated with grit blasting, smudging or coating. The composite material can be composed of the stacking multi layers, such as the strip which is composed of a plastic material layer covered by double black carbon material on both sides thereof. The material will not be limited thereto. Therefore, it is favorable for enhancing the anti-noise ability of the light blocking sheet 112 under the scene of the accent light source.

In FIG. 1C, the light transmission portion 145 of each of the light blocking structures 142 includes at least one arc segment, and a curvature center C of each arc segment is disposed inside of the inscribed circle 144. In the 1st embodiment, a number of the arc segment of the light transmission portion 145 of each of the light blocking structures 142 is one, and the arc segments are disposed between the circumscribed circle ends 151 and the inscribed circle ends 152. Therefore, it is favorable for increasing an area of the light transmission portions 145 by the arcs of the light blocking structures 142 facing towards the inside of the inscribed circle 144 so as to enhance the relative illuminance.

In FIGS. 1A and 1B, when a radius of the inscribed circle 144 is Ri, a radius of the circumscribed circle 143 is Ro; a value of an area of the circumscribed circle 143 minus an area of the inscribed circle 144 is AA, the area of the light transmission portions 145 is A1, an area of the light blocking portions 146 is A2, a distance between two of the inscribed circle ends 152 adjacent to each other is L; one of the optical lens elements (which is the optical lens element 125 in the 1 st embodiment) has a maximum outer diameter, the central opening of one of the light blocking sheets (which is the central opening 141 of the light blocking sheet 112 in the 1st embodiment) has a minimum inner diameter, a maximum outer diameter of one of the optical lens elements is φMax, the minimum inner diameter of the central opening of one of the light blocking sheets is φmin; a number of the light blocking structures 142 is N; the imaging lens assembly 100 has a first field of view, the first field of view is FOV1; and an effective focal length of the first imaging lens assembly (which is the imaging lens assembly 100 in the 1st embodiment) is EFL, the detailed optical data of the 1st embodiment are shown in Table 1:

TABLE 1

| 1st embodiment | | | |
|---|---|---|---|
| Ri (μm) | 1050 | (Ro − Ri)/L | 0.36 |
| Ro (μm) | 1108 | φMax (mm) | 4.6 |
| Ro − Ri (μm) | 58 | φmin (mm) | 2.1 |
| AA (mm²) | 0.392 | φmin/φMax | 0.46 |
| A1 (mm²) | 0.276 | N | 40 |
| A2 (mm²) | 0.116 | FOV1 (degrees) | 30 |
| A1/A2 | 2.38 | EFL (mm) | 7.48 |
| L (μm) | 161 | EFL/φMax | 1.63 |

2nd Embodiment

Figure 2A:
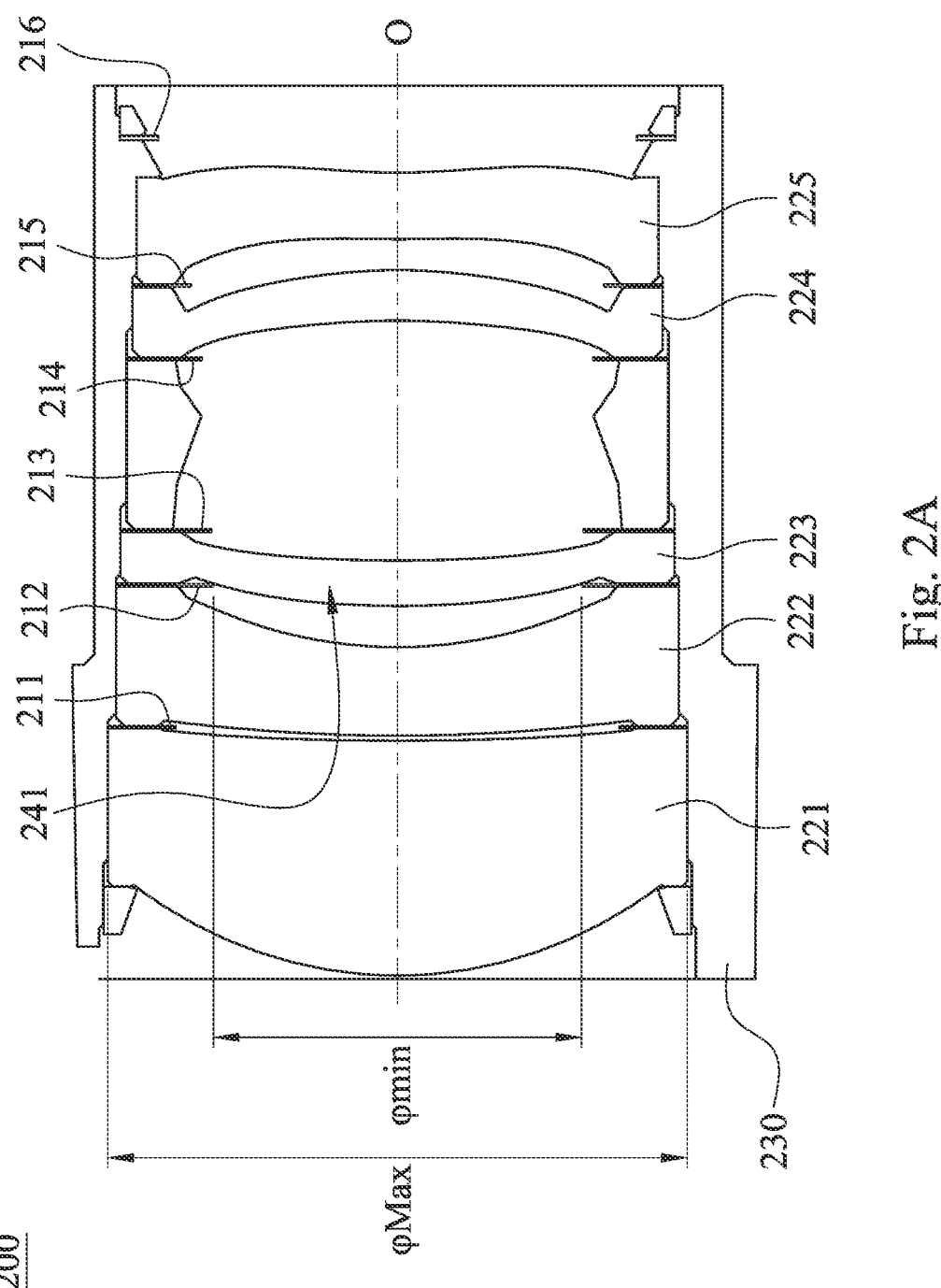
FIG. 2A is a schematic view of an imaging lens assembly according to the 2nd embodiment of the present disclosure.

FIG. 2A is a schematic view of an imaging lens assembly 200 according to the 2nd embodiment of the present disclosure. In FIG. 2A, the imaging lens assembly 200 includes at least one light blocking sheet, at least two optical lens elements and a lens barrel 230, wherein the optical lens elements and the light blocking sheet are disposed in the lens barrel 230 along a central axis O of the imaging lens assembly 200.

In detail, the imaging lens assembly 200 includes, from an object side to an image side, an optical lens element 221, a light blocking sheet 211, an optical lens element 222, a light blocking sheet 212, an optical lens element 223, a light blocking sheet 213, a light blocking sheet 214, an optical lens element 224, a light blocking sheet 215, an optical lens element 225 and a light blocking sheet 216. It should be mentioned that the optical characteristics such as the number of the optical lens elements, the structures, and the surface shape can be disposed according to different imaging requirements, but will not be limited thereto.

Figure 2B:
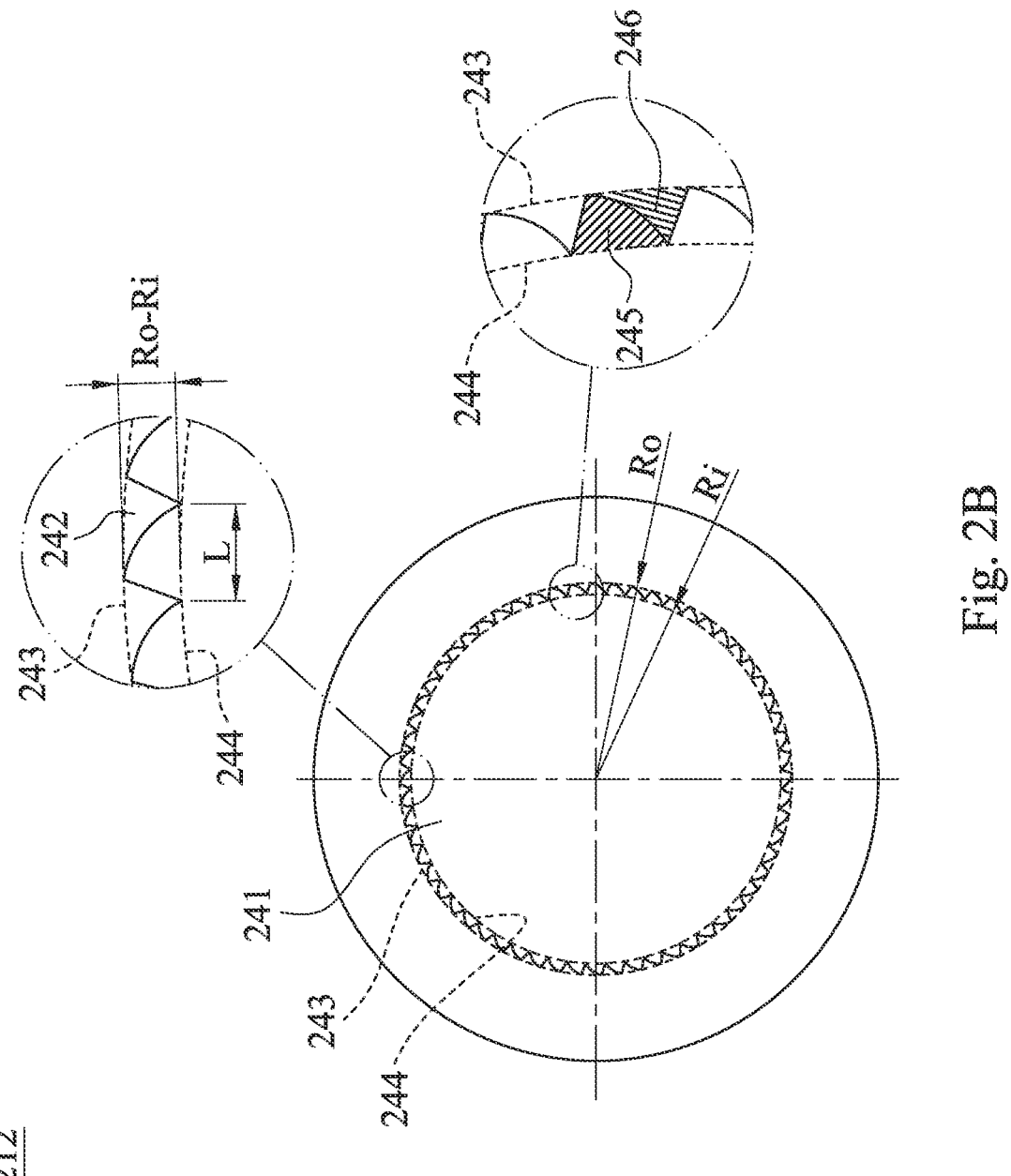
FIG. 2B is a schematic view of the light blocking sheet according to the 2nd embodiment of FIG. 2A.
Figure 2C:
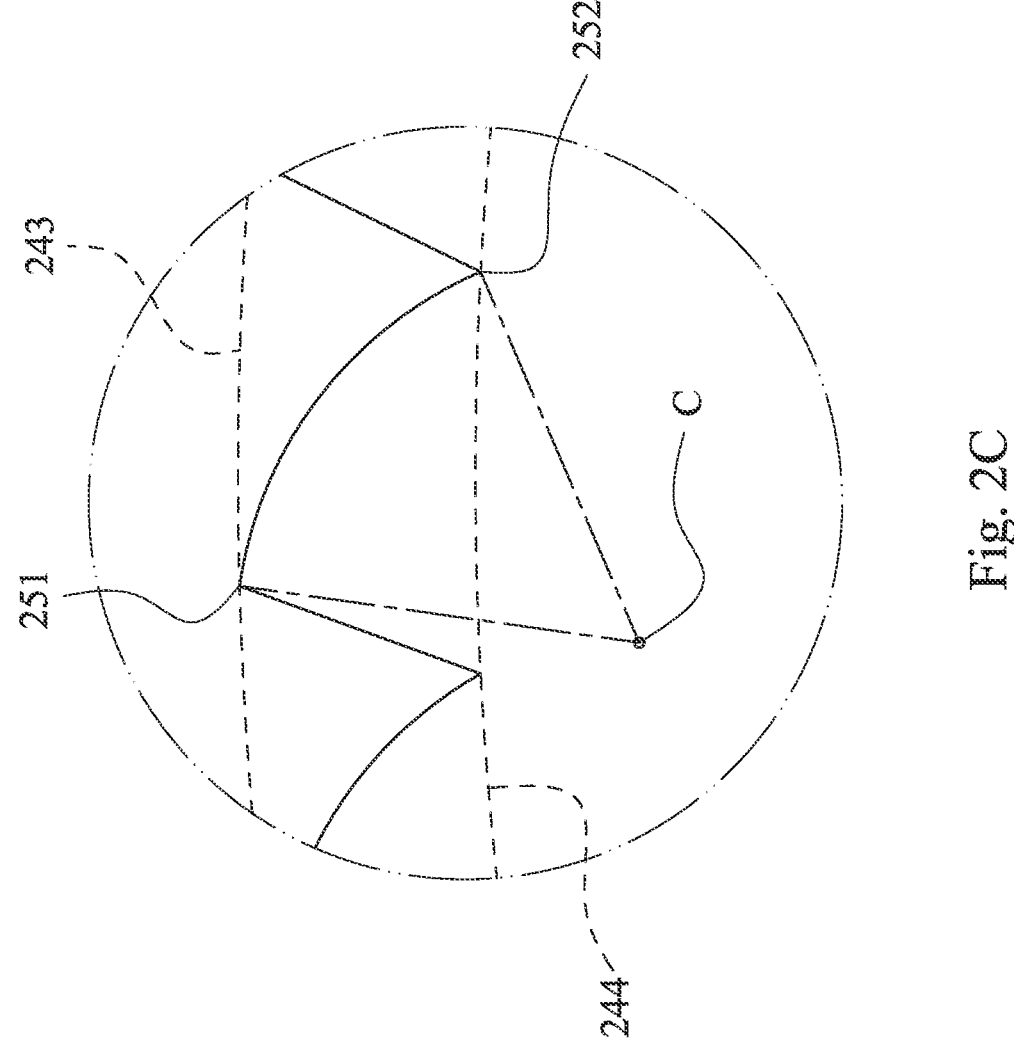
FIG. 2C is an enlarged schematic view of partial of the light blocking sheet according to the 2nd embodiment of FIG. 2B.

FIG. 2B is a schematic view of the light blocking sheet 212 according to the 2nd embodiment of FIG. 2A. FIG. 2C is an enlarged schematic view of partial of the light blocking sheet 212 according to the 2nd embodiment of FIG. 2B. In FIG. 2B and FIG. 2C, the light blocking sheet 212 includes a central opening 241 and a plurality of light blocking structures 242, wherein the central axis O passes through the central opening 241, the light blocking structures 242 surround an inner peripheral surface of the central opening 241 and the light blocking structures 242 are tapered and extended from the central opening 241 towards a direction close to the central axis O. In detail, the light blocking structures 242 are composed of arc segments and straight segments.

The light blocking structures 242 are for defining a circumscribed circle 243 and an inscribed circle 244. A plurality of inscribed circle ends 252 of the light blocking structures 242 close to the central axis O are contacted with the inscribed circle 244. A plurality of circumscribed circle ends 251 of the light blocking structure 242 away from the central axis O are contacted with the circumscribed circle 243. Further, each inscribed circle end 252 and each circumscribed circle end 251 is an end point.

A light transmission portion 245 is between the inscribed circle 244 and each of the light blocking structures 242, and a light blocking portion 246 is between the circumscribed circle 243 and each of the light blocking structures 242.

It is favorable for avoiding the excessive shading of the light blocking structures 242 by controlling an area ratio of the light transmission portions 245 and the light blocking portions 246 so as to enhance the image quality of the imaging lens assembly 200. Further, the original scene can be truly recovered under the harsh environment so as to obtain the image with low noise interference. In detail, the harsh environment can be the scene facing towards the accent light source or low ambient light source.

The light blocking sheet 212 and the light blocking structure 242 can be formed integrally. Therefore, it is favorable for enhancing the manufacture efficiency and suitable for the mass production.

A surface of the light blocking sheet 212 can include a matting layer. Further, the light blocking sheet 212 can be made of the metal material or the composite material. The metal material can be treated with grit blasting, smudging or coating. The composite material can be composed of the stacking multi layers, such as the strip which is composed of a plastic material layer covered by double black carbon material on both sides thereof. The material will not be limited thereto. Therefore, it is favorable for enhancing the anti-noise ability of the light blocking sheet 212 under the scene of the accent light source.

In FIG. 2C, the light transmission portion 245 of each of the light blocking structures 242 include at least one arc segment, and a curvature center C of each arc segment is disposed inside of the inscribed circle 244. In the 2nd embodiment, a number of the arc segment of the light transmission portion 245 of each of the light blocking structures 242 is one, and the arc segments are disposed between the circumscribed circle ends 251 and the inscribed circle ends 252. Therefore, it is favorable for increasing an area of the light transmission portions 245 by the arcs of the light blocking structures 242 facing towards the inside of the inscribed circle 244 so as to enhance the relative illuminance.

In FIGS. 2A and 2B, when a radius of the inscribed circle 244 is Ri, a radius of the circumscribed circle 243 is Ro; a value of an area of the circumscribed circle 243 minus an area of the inscribed circle 244 is AA, the area of the light transmission portions 245 is A1, an area of the light blocking portions 246 is A2, a distance between two of the inscribed circle ends 252 adjacent to each other is L; one of the optical lens elements (which is the optical lens element 221 in the 2nd embodiment) has a maximum outer diameter, the central opening of one of the light blocking sheets (which is the central opening 241 of the light blocking sheet 212 in the 2nd embodiment) has a minimum inner diameter, a maximum outer diameter of one of the optical lens elements is φMax, the minimum inner diameter of the central opening of one of the light blocking sheets is φmin; a number of the light blocking structures 242 is N; the imaging lens assembly 200 has a first field of view, the first field of view is FOV1; and an effective focal length of the first imaging lens assembly (which is the imaging lens assembly 200 in the 2nd embodiment) is EFL, the detailed optical data of the 2nd embodiment are shown in Table 2:

TABLE 2

| 2nd embodiment | | | |
| --- | --- | --- | --- |
| Ri (μm) | 1700 | (Ro − Ri)/L | 0.59 |
| Ro (μm) | 1805 | φMax (mm) | 5.35 |
| Ro − Ri (μm) | 105 | φmin (mm) | 3.4 |
| AA (mm²) | 1.156 | φmin/φMax | 0.64 |
| A1 (mm²) | 0.716 | N | 60 |
| A2 (mm²) | 0.440 | FOV1 (degrees) | 27 |
| A1/A2 | 1.63 | EFL (mm) | 16.85 |
| L (μm) | 178 | EFL/φMax | 3.15 |

3rd Embodiment

Figure 3A:
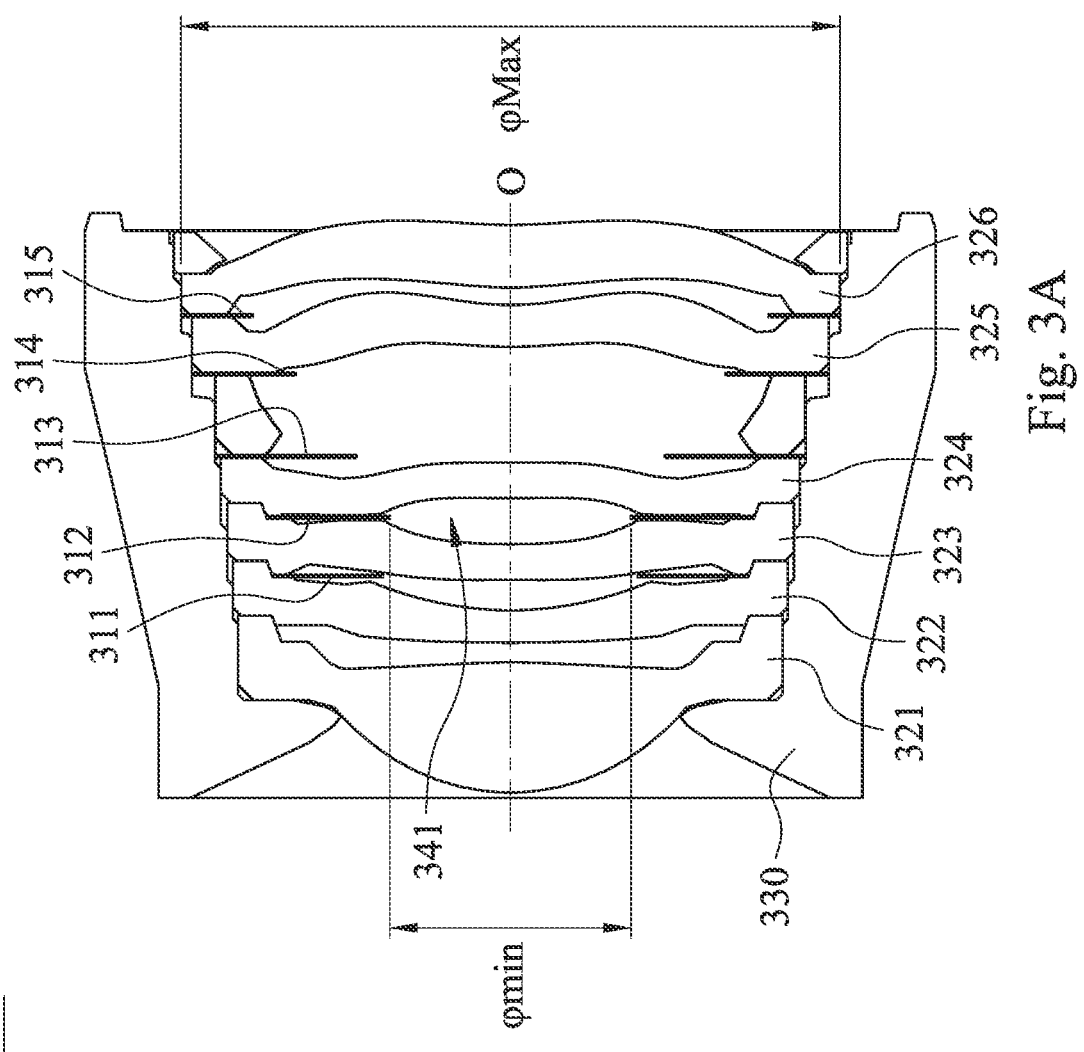
FIG. 3A is a schematic view of an imaging lens assembly according to the 3rd embodiment of the present disclosure.

FIG. 3A is a schematic view of an imaging lens assembly 300 according to the 3rd embodiment of the present disclosure. In FIG. 3A, the imaging lens assembly 300 includes at least one light blocking sheet, at least two optical lens elements and a lens barrel 330, wherein the optical lens elements and the light blocking sheet are disposed in the lens barrel 330 along a central axis O of the imaging lens assembly 300.

In detail, the imaging lens assembly 300 includes, from an object side to an image side, an optical lens element 321, an optical lens element 322, a light blocking sheet 311, an optical lens element 323, a light blocking sheet 312, an optical lens element 324, a light blocking sheet 313, a light blocking sheet 314, an optical lens element 325, a light blocking sheet 315 and an optical lens element 326. It should be mentioned that the optical characteristics such as the number of the optical lens elements, the structures, and the surface shape can be disposed according to different imaging requirements, but will not be limited thereto.

Figure 3B:
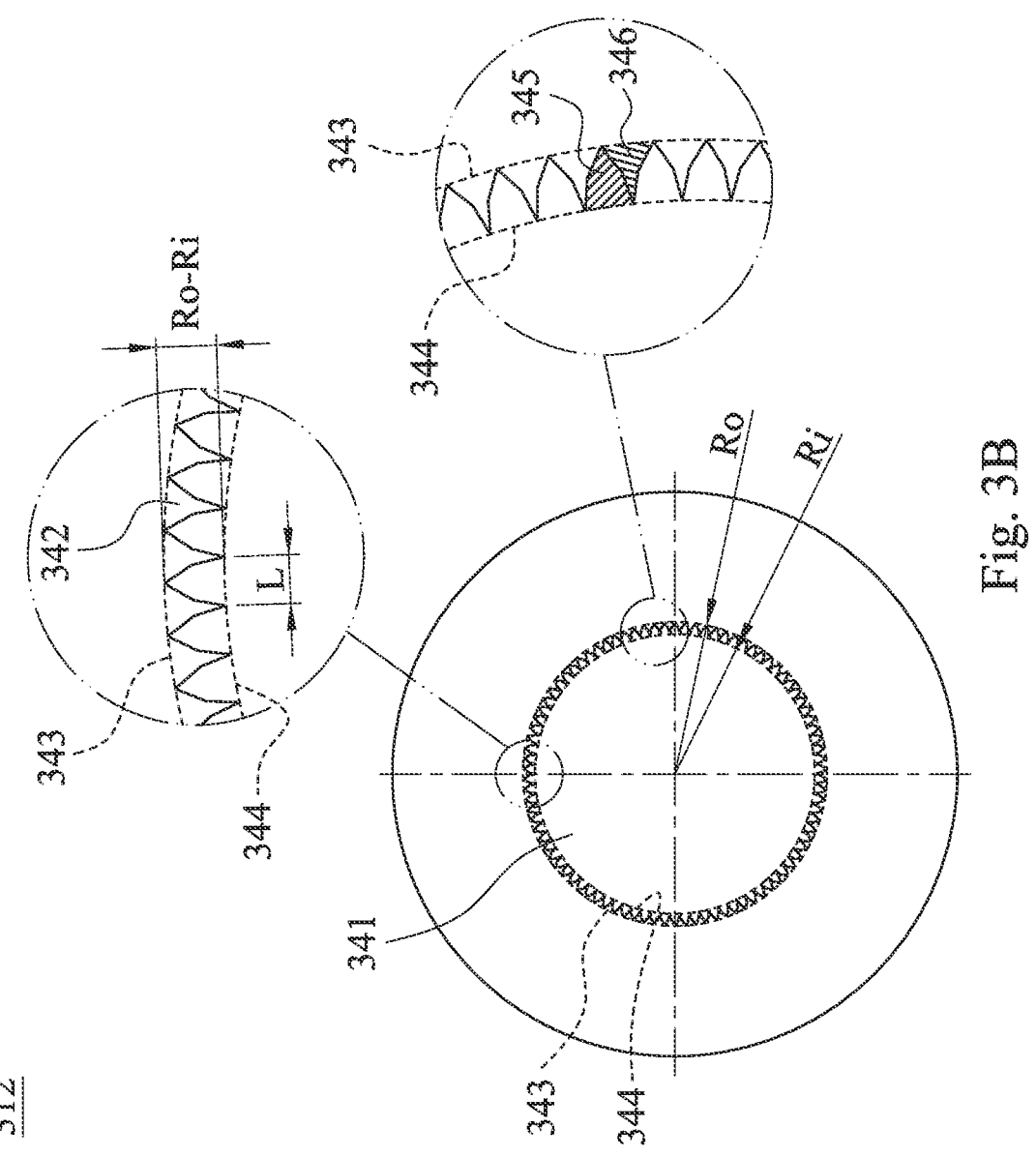
FIG. 3B is a schematic view of the light blocking sheet according to the 3rd embodiment of FIG. 3A.
Figure 3C:
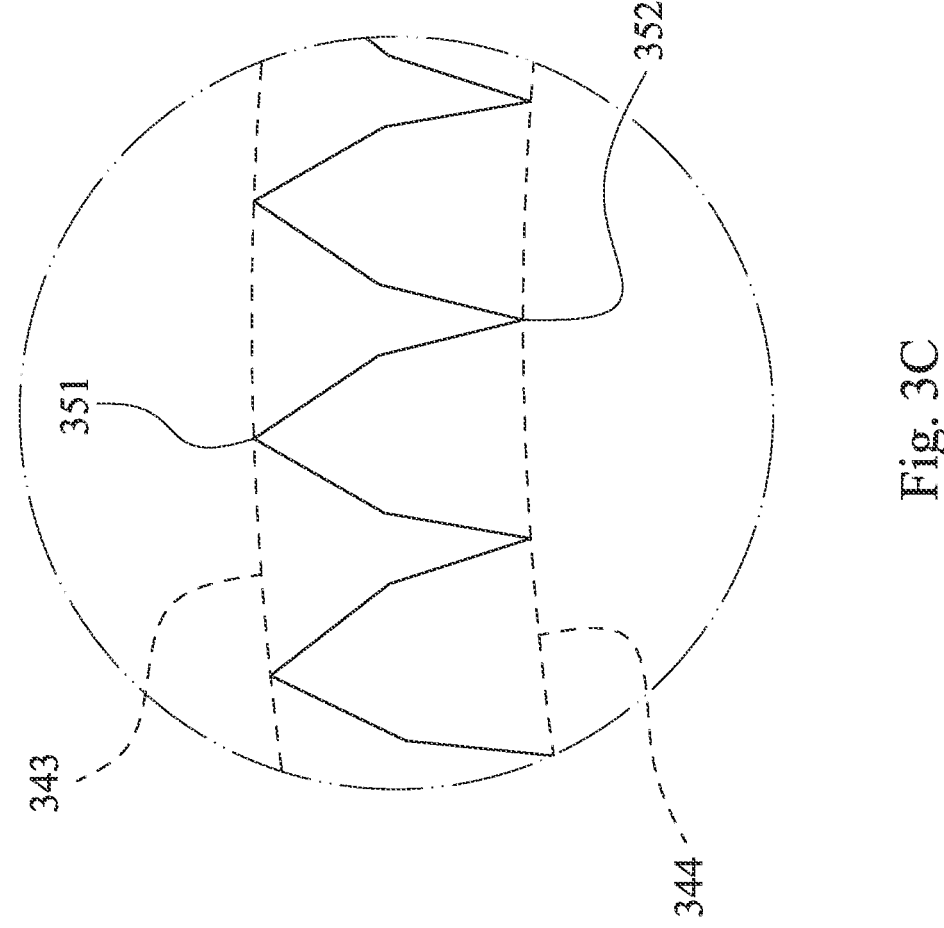
FIG. 3C is an enlarged schematic view of partial of the light blocking sheet according to the 3rd embodiment of FIG. 3B.

FIG. 3B is a schematic view of the light blocking sheet 312 according to the 3rd embodiment of FIG. 3A. FIG. 3C is an enlarged schematic view of partial of the light blocking sheet 312 according to the 3rd embodiment of FIG. 3B. In FIG. 3B and FIG. 3C, the light blocking sheet 312 includes a central opening 341 and a plurality of light blocking structures 342, wherein the central axis O passes through the central opening 341, the light blocking structures 342 surround an inner peripheral surface of the central opening 341 and the light blocking structures 342 are tapered and extended from the central opening 341 towards a direction close to the central axis O. In detail, the light blocking structures 342 are composed of straight segments.

The light blocking structures 342 are for defining a circumscribed circle 343 and an inscribed circle 344. A plurality of inscribed circle ends 352 of the light blocking structures 342 close to the central axis O are contacted with the inscribed circle 344. A plurality of circumscribed circle ends 352 of the light blocking structures 342 away from the central axis O are contacted with the circumscribed circle 343. Further, each inscribed circle end 352 and each circumscribed circle end 351 is an end point.

A light transmission portion 345 is between the inscribed circle 344 and each of the light blocking structures 342, and a light blocking portion 346 is between the circumscribed circle 343 and each of the light blocking structures 342.

It is favorable for avoiding the excessive shading of the light blocking structures 342 by controlling an area ratio of the light transmission portions 345 and the light blocking portions 346 so as to enhance the image quality of the imaging lens assembly 300. Further, the original scene can be truly recovered under the harsh environment so as to obtain the image with low noise interference. In detail, the harsh environment can be the scene facing towards the accent light source or low ambient light source.

The light blocking sheet 312 and the light blocking structures 342 can be formed integrally. Therefore, it is favorable for enhancing the manufacture efficiency and suitable for the mass production.

A surface of the light blocking sheet 312 can include a matting layer. Further, the light blocking sheet 312 can be made of the metal material or the composite material. The metal material can be treated with grit blasting, smudging or coating. The composite material can be composed of the stacking multi layers, such as the strip which is composed of a plastic material layer covered by double black carbon material on both sides thereof. The material will not be limited thereto. Therefore, it is favorable for enhancing the anti-noise ability of the light blocking sheet 312 under the scene of the accent light source.

In FIGS. 3A and 3B, when a radius of the inscribed circle 344 is Ri, a radius of the circumscribed circle 343 is Ro; a value of an area of the circumscribed circle 343 minus an area of the inscribed circle 344 is AA, an area of the light transmission portions 345 is A1, an area of the light blocking portions 346 is A2, a distance between two of the inscribed circle ends 352 adjacent to each other is L; one of the optical lens elements (which is the optical lens element 326 in the 3rd embodiment) has a maximum outer diameter, the central opening of one of the light blocking sheets (which is the central opening 341 of the light blocking sheet 312 in the 3rd embodiment) has a minimum inner diameter, a maximum outer diameter of one of the optical lens elements is φMax, the minimum inner diameter of the central opening of one of the light blocking sheets is φmin; a number of the light blocking structures 342 is N; the imaging lens assembly 300 has a first field of view, the first field of view is FOV1; and an effective focal length of the first imaging lens assembly (which is the imaging lens assembly 300 in the 3rd embodiment) is EFL, the detailed optical data of the 3rd embodiment are shown in Table 3:

TABLE 3

| 3rd embodiment | | | |
|---|---|---|---|
| Ri (μm) | 1040 | (Ro − Ri)/L | 1.23 |
| Ro (μm) | 1130 | φMax (mm) | 5.685 |
| Ro − Ri (μm) | 90 | φmin (mm) | 2.08 |
| AA (mm²) | 0.612 | φmin/φMax | 0.37 |
| A1 (mm²) | 0.369 | N | 90 |
| A2 (mm²) | 0.243 | FOV1 (degrees) | 45 |
| A1/A2 | 1.52 | EFL (mm) | 6.01 |
| L (μm) | 73 | EFL/φMax | 1.06 |

4th Embodiment

FIG. 4A is a schematic view of an imaging lens assembly 400 according to the 4th embodiment of the present disclosure. In FIG. 4A, the imaging lens assembly 400 includes at least one light blocking sheet, at least two optical lens elements and a lens barrel 430, wherein the optical lens elements and the light blocking sheet are disposed in the lens barrel 430 along a central axis O of the imaging lens assembly 400.

In detail, the imaging lens assembly 400 includes, from an object side to an image side, an optical lens element 421, an optical lens element 422, a light blocking sheet 411, an optical lens element 423, a light blocking sheet 412, an optical lens element 424, a light blocking sheet 413, an optical lens element 425, a light blocking sheet 414, a light blocking sheet 415 and an optical lens element 426. It should be mentioned that the optical characteristics such as the number of the optical lens elements, the structures, and the surface shape can be disposed according to different imaging requirements, but will not be limited thereto.

FIG. 4B is a schematic view of the light blocking sheet 412 according to the 4th embodiment of FIG. 4A. FIG. 4C is an enlarged schematic view of partial of the light blocking sheet 412 according to the 4th embodiment of FIG. 4B. In FIG. 4B and FIG. 4C, the light blocking sheet 412 includes a central opening 441 and a plurality of light blocking structures 442, wherein the central axis O passes through the central opening 441, the light blocking structures 442 surround an inner peripheral surface of the central opening 441 and the light blocking structures 442 are tapered and extended from the central opening 441 towards a direction close to the central axis O. In detail, the light blocking structures 442 are composed of arc segments.

The light blocking structures 442 are for defining a circumscribed circle 443 and an inscribed circle 444. A plurality of inscribed circle ends 452 of the light blocking structures 442 close to the central axis O are contacted with the inscribed circle 444. A plurality of circumscribed circle ends 451 of the light blocking structures 442 away from the central axis O are contacted with the circumscribed circle 443. Further, each inscribed circle end 452 is an end point, and each circumscribed circle end 451 is an end point which tangents with the circumscribed circle 443.

A light transmission portion 445 is between the inscribed circle 444 and each of the light blocking structures 442, and a light blocking portion 446 is between the circumscribed circle 443 and each of the light blocking structures 442.

It is favorable for avoiding the excessive shading of the light blocking structures 442 by controlling an area ratio of the light transmission portions 445 and the light blocking portions 446 so as to enhance the image quality of the imaging lens assembly 400. Further, the original scene can be truly recovered under the harsh environment so as to obtain the image with low noise interference. In detail, the harsh environment can be the scene facing towards the accent light source or low ambient light source.

The light blocking sheet 412 and the light blocking structures 442 can be formed integrally. Therefore, it is favorable for enhancing the manufacture efficiency and suitable for the mass production.

A surface of the light blocking sheet 412 can include a matting layer. Furthermore, the light blocking sheet 412 can be made of the metal material or the composite material. The metal material can be treated with grit blasting, smudging or coating. The composite material can be composed of the stacking multi layers, such as the strip which is composed of a plastic material layer covered by double black carbon material on both sides thereof. The material will not be limited thereto. Therefore, it is favorable for enhancing the anti-noise ability of the light blocking sheet 412 under the scene of the accent light source.

In FIG. 4C, the light transmission portion 445 of each of the light blocking structures 442 include at least one arc segment, and a curvature center C of each arc segment is disposed inside of the inscribed circle 444. In the 4th embodiment, a number of the arc segment of the light transmission portion 445 of each of the light blocking structures 442 is two, and the arc segments are disposed between the inscribed circle ends 452. The one of the arc segments is a point which each circumscribed circle end 451 tangents with the circumscribed circle 443. Therefore, it is favorable for increasing an area of the light transmission portions 445 by the arcs of the light blocking structures 442 facing towards the inside of the inscribed circle 444 so as to enhance the relative illuminance.

In FIGS. 4A and 4B, when a radius of the inscribed circle 444 is Ri, a radius of the circumscribed circle 443 is Ro; a value of an area of the circumscribed circle 443 minus an area of the inscribed circle 444 is AA, the area of the light transmission portions 445 is A1, an area of the light blocking portions 446 is A2, a distance between two of the inscribed circle ends 452 adjacent to each other is L; one of the optical lens elements (which is the optical lens element 426 in the 4th embodiment) has a maximum outer diameter, the central opening of one of the light blocking sheets (which is the central opening 441 of the light blocking sheet 412 in the 4th embodiment) has a minimum inner diameter, a maximum outer diameter of one of the optical lens elements is φMax, the minimum inner diameter of the central opening of one of the light blocking sheet is φmin; a number of the light blocking structures 442 is N; the imaging lens assembly 400 has a first field of view, the first field of view is FOV1; and an effective focal length of the first imaging lens assembly (which is the imaging lens assembly 400 in the 4th embodiment) is EFL, the detailed optical data of the 4th embodiment are shown in Table 4:

TABLE 4

| 4th embodiment | | | |
|---|---|---|---|
| Ri (μm) | 825 | (Ro − Ri)/L | 0.29 |
| Ro (μm) | 875 | φMax (mm) | 5 |
| Ro − Ri (μm) | 50 | φmin (mm) | 1.65 |
| AA (mm²) | 0.267 | φmin/φMax | 0.33 |
| A1 (mm²) | 0.174 | N | 30 |
| A2 (mm²) | 0.093 | FOV1 (degrees) | 47 |
| A1/A2 | 1.87 | EFL (mm) | 6 |
| L (μm) | 172 | EFL/φMax | 1.2 |

5th Embodiment

FIG. 5A is a schematic view of an imaging lens assembly 500 according to the 5th embodiment of the present disclosure. In FIG. 5A, the imaging lens assembly 500 includes at least one light blocking sheet, at least two optical lens elements and a lens barrel 530, wherein the optical lens elements and the light blocking sheet are disposed in the lens barrel 530 along a central axis O of the imaging lens assembly 500.

In detail, the imaging lens assembly 500 includes, from an object side to an image side, an optical lens element 521, a light blocking sheet 511, an optical lens element 522, a light blocking sheet 512, an optical lens element 523, a light blocking sheet 513, an optical lens element 524, a light blocking sheet 514, a light blocking sheet 515, an optical lens element 525, a light blocking sheet 516 and an optical lens element 526. It should be mentioned that the optical characteristics such as the number of the optical lens elements, the structures, and the surface shape can be disposed according to different imaging requirements, but will not be limited thereto.

FIG. 5B is a schematic view of the light blocking sheet 513 according to the 5th embodiment of FIG. 5A. FIG. 5C is an enlarged schematic view of partial of the light blocking sheet 513 according to the 5th embodiment of FIG. 5B. In FIG. 5B and FIG. 5C, the light blocking sheet 513 includes a central opening 541 and a plurality of light blocking structures 542, wherein the central axis O passes through the central opening 541, the light blocking structures 542 surround an inner peripheral surface of the central opening 541 and the light blocking structures 542 are tapered and extended from the central opening 541 towards a direction close to the central axis O. In detail, the light blocking structures 542 are composed of straight segments.

The light blocking structures 542 are for defining a circumscribed circle 543 and an inscribed circle 544. A plurality of inscribed circle ends 552 of the light blocking structures 542 close to the central axis O are contacted with the inscribed circle 544. A plurality of circumscribed circle ends 552 of the light blocking structures 542 away from the central axis O are contacted with the circumscribed circle 543. Further, all of the inscribed circle ends 552 and the circumscribed circle ends 551 are the end points. In detail, each inscribed circle end 552 and each circumscribed circle end 551 has a rounded angle (its number is omitted), respectively. A curvature radius of the rounded angle is R, all of the curvature radii R of the inscribed circle ends 552 and the circumscribed circle ends 551 are 0.025 mm.

A light transmission portion 545 is between the inscribed circle 544 and each of the light blocking structures 542, and a light blocking portion 546 is between the circumscribed circle 543 and each of the light blocking structures 542.

It is favorable for avoiding the excessive shading of the light blocking structures 542 by controlling an area ratio of the light transmission portions 545 and the light blocking portions 546 so as to enhance the image quality of the imaging lens assembly 500. Further, the original scene can be truly recovered under the harsh environment so as to obtain the image with low noise interference. In detail, the harsh environment can be the scene facing towards the accent light source or low ambient light source.

The light blocking sheet 513 and the light blocking structures 542 can be formed integrally. Therefore, it is favorable for enhancing the manufacture efficiency and suitable for the mass production.

A surface of the light blocking sheet 513 can include a matting layer. Furthermore, the light blocking sheet 513 can be made of the metal material or the composite material. The metal material can be treated with grit blasting, smudging or coating. The composite material can be composed of the stacking multi layers, such as the strip which is composed of a plastic material layer covered by double black carbon material on both sides thereof. The material will not be limited thereto. Therefore, it is favorable for enhancing the anti-noise ability of the light blocking sheet 513 under the scene of the accent light source.

In FIGS. 5A and 5B, when a radius of the inscribed circle 544 is Ri, a radius of the circumscribed circle 543 is Ro; a value of an area of the circumscribed circle 543 minus an area of the inscribed circle 544 is AA, an area of the light transmission portions 545 is A1, an area of the light blocking portions 546 is A2, a distance between two of the inscribed circle ends 552 adjacent to each other is L; one of the optical lens elements (which is the optical lens element 526 in the 5th embodiment) has a maximum outer diameter, the central opening of one of the light blocking sheets (which is the central opening 541 of the light blocking sheet 513 in the 5th embodiment) has a minimum inner diameter, a maximum outer diameter of one of the optical lens elements is φMax, the minimum inner diameter of the central opening of one of the light blocking sheets is φmin; a number of the light blocking structures 542 is N; the imaging lens assembly 500 has a first field of view, the first field of view is FOV1; and an effective focal length of the first imaging lens assembly (which is the imaging lens assembly 500 in the 5th embodiment) is EFL, the detailed optical data of the 5th embodiment are shown in Table 5:

TABLE 5

| 5th embodiment | | | |
|---|---|---|---|
| Ri (μm) | 1040 | (Ro – Ri)/L | 0.87 |
| Ro (μm) | 1119 | φMax (mm) | 5.69 |
| Ro – Ri (μm) | 79 | φmin (mm) | 2.07 |
| AA (mm²) | 0.5328 | φmin/φMax | 0.36 |
| A1 (mm²) | 0.2592 | N | 72 |
| A2 (mm²) | 0.2736 | FOV1 (degrees) | 37 |
| A1/A2 | 0.95 | EFL (mm) | 7.5 |
| L (μm) | 91 | EFL/φMax | 1.32 |

6th Embodiment

FIG. 6A is a schematic view of an imaging lens assembly 600 according to the 6th embodiment of the present disclosure. In FIG. 6A, the imaging lens assembly 600 includes at least one light blocking sheet, at least two optical lens elements and a lens barrel 630, wherein the optical lens elements and the light blocking sheet are disposed in the lens barrel 630 along a central axis O of the imaging lens assembly 600.

In detail, the imaging lens assembly 600 includes, from an object side to an image side, an optical lens element 621, an optical lens element 622, a light blocking sheet 611, an optical lens element 623, a light blocking sheet 612, an optical lens element 624, a light blocking sheet 613 and an optical lens element 625. It should be mentioned that the optical characteristics such as the number of the optical lens elements, the structures, and the surface shape can be disposed according to different imaging requirements, but will not be limited thereto.

FIG. 6B is a schematic view of the light blocking sheet 613 according to the 6th embodiment of FIG. 6A. FIG. 6C is an enlarged schematic view of partial of the light blocking sheet 613 according to the 6th embodiment of FIG. 6B. In FIG. 6B and FIG. 6C, the light blocking sheet 613 includes a central opening 641 and a plurality of light blocking structures 642, wherein the central axis O passes through the central opening 641, the light blocking structures 642 surround an inner peripheral surface of the central opening 641 and the light blocking structures 642 are tapered and extended from the central opening 641 towards a direction close to the central axis O. In detail, the light blocking structures 642 are composed of arc segments.

The light blocking structures 642 are for defining a circumscribed circle 643 and an inscribed circle 644. A plurality of inscribed circle ends 652 of the light blocking structures 642 close to the central axis O are contacted with the inscribed circle 644. A plurality of circumscribed circle ends 651 of the light blocking structures 642 away from the central axis O are contacted with the circumscribed circle 643. Further, each inscribed circle end 652 is an arc segment which coincides with the inscribed circle 644, and each circumscribed circle end 651 is an arc segment which coincides with the circumscribed circle 643.

A light transmission portion 645 is between the inscribed circle 644 and each of the light blocking structures 642, and a light blocking portion 646 is between the circumscribed circle 643 and each of the light blocking structures 642.

It is favorable for avoiding the excessive shading of the light blocking structures 642 by controlling an area ratio of the light transmission portions 645 and the light blocking portions 646 so as to enhance the image quality of the imaging lens assembly 600. Further, the original scene can be truly recovered under the harsh environment so as to obtain the image with low noise interference. In detail, the harsh environment can be the scene facing towards the accent light source or low ambient light source.

The light blocking sheet 613 and the light blocking structures 642 can be formed integrally. Therefore, it is favorable for enhancing the manufacture efficiency and suitable for the mass production.

A surface of the light blocking sheet 613 can include a matting layer. Further, the light blocking sheet 613 can be made of the metal material or the composite material. The metal material can be treated with grit blasting, smudging or coating. The composite material can be composed of the stacking multi layers, such as the strip which is composed of a plastic material layer covered by double black carbon material on both sides thereof. The material will not be limited thereto. Therefore, it is favorable for enhancing the anti-noise ability of the light blocking sheet 613 under the scene of the accent light source.

In FIG. 6C, the light transmission portion 645 of each of the light blocking structures 642 include at least one arc segment, and a curvature center C of each arc segment is disposed inside of the inscribed circle 644. In the 6th embodiment, a number of the arc segment of the light transmission portion 645 of each of the light blocking structures 642 is two, and the arc segments are disposed between the circumscribed circle ends 651 and the inscribed circle ends 652. Therefore, it is favorable for increasing an area of the light transmission portions 645 by the arcs of the light blocking structures 642 facing towards the inside of the inscribed circle 644 so as to enhance the relative illuminance.

In FIGS. 6A and 6B, when a radius of the inscribed circle 644 is Ri, a radius of the circumscribed circle 643 is Ro; a value of an area of the circumscribed circle 643 minus an area of the inscribed circle 644 is AA, the area of the light transmission portions 645 is A1, an area of the light blocking portions 646 is A2, a distance between two of the inscribed circle ends 652 adjacent to each other is L; one of the optical lens elements (which is the optical lens element 625 in the 6th embodiment) has a maximum outer diameter, the central opening of one of the light blocking sheets (which is the central opening 647 of the light blocking sheet 611 in the 6th embodiment) has a minimum inner diameter, a maximum outer diameter of one of the optical lens elements is φMax, the minimum inner diameter of the central opening of one of the light blocking sheets is φmin; a number of the light blocking structures 642 is N; the imaging lens assembly 600 has a first field of view, the first field of view is FOV1; and an effective focal length of the first imaging lens assembly (which is the imaging lens assembly 600 in the 6th embodiment) is EFL, the detailed optical data of the 6th embodiment are shown in Table 6:

TABLE 6

|  | 6th embodiment |  |  |
|---|---|---|---|
| Ri (μm) | 1830 | (Ro − Ri)/L | 0.23 |
| Ro (μm) | 1891 | φMax (mm) | 4.85 |
| Ro − Ri (μm) | 61 | φmin (mm) | 1.76 |
| AA (mm²) | 0.7093 | φmin/φMax | 0.36 |
| A1 (mm²) | 0.5863 | N | 41 |
| A2 (mm²) | 0.123 | FOV1 (degrees) | 47 |
| A1/A2 | 4.77 | EFL (mm) | 6.83 |
| L (μm) | 267 | EFL/φMax | 1.41 |

7th Embodiment

FIG. 7A is a schematic view of an electronic device 70 according to the 7th embodiment of the present disclosure. FIG. 7B is a block diagram of the electronic device 70 according to the 7th embodiment of FIG. 7A. In FIGS. 7A and 7B, the electronic device 70 is a smart phone and includes at least two imaging lens assemblies. The imaging lens assemblies have different field of views. Further, a number of the imaging lens assemblies can be at least three, wherein the one of the imaging lens assemblies is a first imaging lens assembly, another one of the imaging lens assemblies is a second imaging lens assembly, and further another one of the imaging lens assemblies is a third imaging lens assembly. The first imaging lens assembly includes at least one light blocking sheet and at least two optical lens elements, wherein the light blocking sheet includes a central opening and a plurality of light blocking structures. In detail, the electronic device 70 includes the imaging lens assemblies with different field of views. When one of the imaging lens assemblies has a specific imaging field of view coupled with the light blocking structures of the light blocking sheet, it is favorable for obtaining a similar level of image quality when the imaging lens assemblies are switched the screens under the harsh environment. Therefore, when photo shooting under the different field of views change continuously, it is favorable for preventing the image quality from discrepancy and time difference so as to maintain better shooting experience.

In the 7th embodiment, the electronic device 70 includes four imaging lens assemblies: a long focal telephoto imaging lens assembly 711 (which is the first imaging lens assembly), a wide-angle main imaging lens assembly 714 (which is the second imaging lens assembly), an ultra-wide-angle imaging lens assembly 712 (which is the other second imaging lens assembly) and an ultra-long-focal telephoto imaging lens assembly 713 (which is the third imaging lens assembly). In detail, the long focal telephoto imaging lens assembly 711 has small field of view, and through the characteristic of smaller incidence angle of the light of the long focal telephoto imaging lens assembly 711 can further reduce the excessive shading. Furthermore, the electronic device 70 can accomplish the function of the optical zoom with switching different field of views of the imaging lens assemblies. It should be mentioned that an imaging lens assembly cover 72 is only for signifying the long focal telephoto imaging lens assembly 711, the ultra-wide-angle imaging lens assembly 712, the ultra-long-focal telephoto imaging lens assembly 713 and the wide-angle main imaging lens assembly 714, but not indicates that the imaging lens assembly cover 72 is removable. In detail, the long focal telephoto imaging lens assembly 711 can be any one of the aforementioned imaging lens assembly in the 1st embodiment to the 6th embodiment, but is not limited thereto.

The electronic device 70 can further include an image sensor 73 and a user interface 74. The image sensor 73 is disposed on the image surface (its number is omitted) of each of the long focal telephoto imaging lens assembly 711, the ultra-wide-angle imaging lens assembly 712, the ultra-long-focal telephoto imaging lens assembly 713 and the wide-angle main imaging lens assembly 714. The user interface 74 can be a touch screen or a display screen, but is not limited thereto.

Furthermore, the user enters the shooting mode through the user interface 74 of the electronic device 70. The long focal telephoto imaging lens assembly 711, the ultra-wide-angle imaging lens assembly 712, the ultra-long-focal telephoto imaging lens assembly 713 and the wide-angle main imaging lens assembly 714 converge the imaging light on the image sensor 73 and output an electronic signal of the image to the image signal processor (ISP) 75.

To meet a specification of the camera module of the electronic device 70, the electronic device 70 can further include an optical anti-shake mechanism 76, which can be an optical image stabilization (OIS). Further, the electronic device 70 can further include at least one auxiliary optical element (its reference numeral is omitted) and at least one sensing element 77. According to the 7th embodiment, the auxiliary optical element is a flash module 78 and a focusing assisting module 79. The flash module 78 is for compensating a color temperature, and the focusing assisting module 79 can be an infrared distance measurement component, a laser focus module, etc. The sensing element 77 can have functions for sensing physical momentum and kinetic energy, such as an accelerator, a gyroscope, a Hall Effect Element, to sense shaking or jitters applied by hands of the user or external environments. Accordingly, an auto-focusing mechanism and the optical anti-shake mechanism 76 disposed on the imaging lens assembly (which is the long focal telephoto imaging lens assembly 711, the ultra-wide-angle imaging lens assembly 712, the ultra-long-focal telephoto imaging lens assembly 713 and the wide-angle main imaging lens assembly 714) of the electronic device 70 can be enhanced to achieve the superior image quality. Furthermore, the electronic device 70 according to the present disclosure can have a capturing function with multiple modes, such as taking optimized selfies, high dynamic range (HDR) under a low light condition, 4K resolution recording, etc. Furthermore, the users can visually see a captured image of the camera through the touch screen and manually operate the view finding range on the touch screen to achieve the autofocus function of what you see is what you get.

Further, the electronic device 70 can further include, but not limited to a display unit, a control unit, a storage unit, a RAM, a ROM or other combinations.

In detail, the long focal telephoto imaging lens assembly 711 has a first field of view, each of the wide-angle main imaging lens assembly 714 and the ultra-wide-angle imaging lens assembly 712 has a second field of view, the ultra-long-focal telephoto imaging lens assembly 713 has a third field of view. When the first field of view is FOV1, the second field of view is FOV2, and the third field of view is FOV3, the detailed optical data of the 7th embodiment are shown in Table 7:

TABLE 7

| 7th embodiment | | | |
|---|---|---|---|
| FOV1 (degrees) | 20~50 | FOV3 (degrees) | 5~20 |
| FOV2 (degrees) | 65~130 | | |

Moreover, the structures and the configurations of other elements in the 7th embodiment are the same as any of the aforementioned 1st embodiment to 6th embodiment, the further descriptions will be omitted.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A light blocking sheet, comprising:
a central opening, a central axis passing through the central opening; and
a plurality of light blocking structures surrounding an inner peripheral surface of the central opening, the light blocking structures tapered and extended from the central opening towards a direction close to the central axis, and the light blocking structures for defining a circumscribed circle and an inscribed circle, wherein a plurality of inscribed circle ends of the light blocking structures close to the central axis are contacted with the inscribed circle, and a plurality of circumscribed circle ends of the light blocking structures away from the central axis are contacted with the circumscribed circle;

wherein, a light transmission portion is between the inscribed circle and each of the light blocking structures, and a light blocking portion is between the circumscribed circle and each of the light blocking structures;

wherein, a radius of the inscribed circle is Ri, a radius of the circumscribed circle is Ro, a distance between two of the inscribed circle ends adjacent to each other is L, a value of an area of the circumscribed circle minus an area of the inscribed circle is AA, an area of the light transmission portions is A1, an area of the light blocking portions is A2, and the following conditions are satisfied:

$$0.27 \leq (Ro-Ri)/L \leq 1.32;$$

$$34 \ \mu m \leq Ro-Ri \leq 157 \ \mu m;$$

$$AA = A1 + A2; \text{ and}$$

$$1.05 \leq A1/A2 \leq 3.4.$$

2. The light blocking sheet of claim 1, wherein the light blocking sheet and the light blocking structures are formed integrally.

3. The light blocking sheet of claim 2, wherein a surface of the light blocking sheet comprises a matting layer.

4. The light blocking sheet of claim 2, wherein the radius of the inscribed circle is Ri, the radius of the circumscribed circle is Ro, and the following condition is satisfied:

$$46 \ \mu m \leq Ro-Ri \leq 112 \ \mu m.$$

5. The light blocking sheet of claim 2, wherein a number of the light blocking structures is N, and the following condition is satisfied:

$$28 \leq N \leq 93.$$

6. The light blocking sheet of claim 2, wherein the light transmission portion of each of the light blocking structures comprises at least one arc segment, and a curvature center of the at least one arc segment is disposed in the inscribed circle.

7. An imaging lens assembly, comprising:
the light blocking sheet of claim 1; and
at least two optical lens elements, the at least two optical lens elements and the light blocking sheet disposed in a lens barrel along the central axis;
wherein, the imaging lens assembly has a first field of view, the first field of view is FOV1, and the following condition is satisfied:

$$18 \text{ degrees} \leq FOV1 \leq 51 \text{ degrees}.$$

8. An electronic device, comprising:
at least two imaging lens assemblies, the at least two imaging lens assemblies having different field of views, one of the at least two imaging lens assemblies being a first imaging lens assembly, and the first imaging lens assembly having a first field of view, wherein the first imaging lens assembly comprises at least one light blocking sheet, and the at least one light blocking sheet comprises:
a central opening, a central axis of the first imaging lens assembly passing through the central opening; and
a plurality of light blocking structures surrounding an inner peripheral surface of the central opening, the light blocking structures tapered and extended from the central opening towards a direction close to the central axis, and the light blocking structures for defining a circumscribed circle and an inscribed circle, wherein a plurality of inscribed circle ends of the light blocking structures close to the central axis are contacted with the inscribed circle, and a plurality of circumscribed circle ends of the light blocking structures away from the central axis are contacted with the circumscribed circle;

wherein a light transmission portion is between the inscribed circle and each of the light blocking structures, and a light blocking portion is between the circumscribed circle and each of the light blocking structures;

wherein, the first field of view is FOV1, a radius of the inscribed circle is Ri, a radius of the circumscribed circle is Ro, a distance between two of the inscribed circle ends adjacent to each other is L, a value of an area of the circumscribed circle minus an area of the inscribed circle is AA, an area of the light transmission portions is A1, an area of the light blocking portions is A2, and the following conditions are satisfied:

$$0.27 \le (Ro-Ri)/L \le 1.32;$$

$$18 \text{ degrees} \le FOV1 \le 51 \text{ degrees};$$

$$34 \text{ } \mu m \le Ro-Ri \le 157 \text{ } \mu m;$$

$$AA = A1 + A2; \text{ and}$$

$$1.05 \le A1/A2 \le 3.4.$$

9. The electronic device of claim 8, wherein another one of the at least two imaging lens assemblies is a second imaging lens assembly, and the second imaging lens assembly has a second field of view, the second field of view is FOV2, and the following condition is satisfied:

$$68 \text{ degrees} \le FOV2 \le 175 \text{ degrees}.$$

10. The electronic device of claim 9, wherein a number of the at least two imaging lens assemblies is at least three, another one of the at least three imaging lens assemblies is a third imaging lens assembly, and the third imaging lens assembly has a third field of view, the third field of view is FOV3, and the following condition is satisfied:

$$5 \text{ degrees} \le FOV3 \le 22 \text{ degrees}.$$

11. The electronic device of claim 8, wherein the first imaging lens assembly further comprises:

at least two optical lens elements, one of the at least two optical lens elements has a maximum outer diameter;

wherein, a number of the at least one light blocking sheet is plural, and the central opening of one of the light blocking sheets has a minimum inner diameter;

wherein, the maximum outer diameter of the one of the at least two optical lens elements is φMax, the minimum inner diameter of the central opening of the one of the light blocking sheets is φmin, and the following condition is satisfied:

$$0.29 \le \varphi min/\varphi Max \le 0.79.$$

12. The electronic device of claim 8, wherein the first imaging lens assembly further comprises:

at least two optical lens elements, one of the at least two optical lens elements has a maximum outer diameter;

wherein, the maximum outer diameter of the one of the at least two optical lens elements is φMax, an effective focal length of the first imaging lens assembly is EFL, and the following condition is satisfied:

$$0.8 \le EFL/\varphi Max \le 4.2.$$

13. The electronic device of claim 8, wherein the first field of view is FOV1, and the following condition is satisfied:

$$22 \text{ degrees} \le FOV1 \le 40 \text{ degrees}.$$

14. The electronic device of claim 8, wherein the at least one light blocking sheet and the light blocking structures are formed integrally.

15. The electronic device of claim 14, wherein a surface of the at least one light blocking sheet comprises a matting layer.

16. The electronic device of claim 14, wherein the radius of the inscribed circle is Ri, the radius of the circumscribed circle is Ro, and the following condition is satisfied:

$$46 \text{ } \mu m \le Ro-Ri \le 112 \text{ } \mu m.$$

17. The electronic device of claim 14, wherein a number of the light blocking structures is N, and the following condition is satisfied:

$$28 \le N \le 93.$$

18. The electronic device of claim 14, wherein the light transmission portion of each of the light blocking structures comprises at least one arc segment, and a curvature center of the at least one arc segment is disposed in the inscribed circle.

\* \* \* \* \*